United States Patent
Stegmaier

(10) Patent No.: US 11,782,938 B2
(45) Date of Patent: Oct. 10, 2023

(54) DATA PROFILING AND MONITORING

(71) Applicant: ACCENTURE GLOBAL SOLUTIONS LIMITED, Dublin (IE)

(72) Inventor: Christopher James Stegmaier, Aiken, SC (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 17/083,116

(22) Filed: Oct. 28, 2020

(65) Prior Publication Data

US 2022/0050839 A1 Feb. 17, 2022

Related U.S. Application Data

(60) Provisional application No. 63/064,763, filed on Aug. 12, 2020.

(51) Int. Cl.
*G06F 16/2458* (2019.01)
*G06F 16/248* (2019.01)

(52) U.S. Cl.
CPC ........ *G06F 16/2465* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 8,424,075 B1* | 4/2013 | Walsh | H04L 63/0263 726/14 |
| 2005/0097346 A1* | 5/2005 | Pipal | G06F 21/121 726/26 |
| 2006/0203815 A1* | 9/2006 | Couillard | H04L 63/10 370/389 |
| 2010/0324952 A1* | 12/2010 | Bastos | G06Q 30/018 705/317 |
| 2012/0011077 A1 | 1/2012 | Bhagat | |
| 2019/0332769 A1* | 10/2019 | Fralick | G06F 21/566 |

OTHER PUBLICATIONS

Chuck Gehman, "IT Governance and Version Control: What You Need to Know," Jan. 29, 2019, (Year: 2019).*

(Continued)

*Primary Examiner* — Yu Zhao
(74) *Attorney, Agent, or Firm* — Mannava & Kang, P.C.

(57) ABSTRACT

A data monitoring and evaluation system may receive a query associated with a data record from a user. The system obtains target data including a plurality of data presentations associated with the data record. The system identifies a plurality of attributes associated with the data record and maps the same with each of the plurality of data presentations for identifying a data presentation modification. The system may evaluate the data presentation modification to identify a principal data presentation. The system may determine the conformity of the principal data presentation a rule to create a principal data record. The system may determine the conformity of the principal data record to a record acceptance parameter. The system may generate a data modeling result comprising the principal data record conforming to the record acceptance parameter.

14 Claims, 12 Drawing Sheets

(56) References Cited

OTHER PUBLICATIONS

Collibra, "Collibra Platform Factsheet", downloaded Jul. 2020, 2 pages. <https://billigence.com/wp-content/uploads/2020/09/Collibra-Platform-Factsheet.pdf>.
"Git Large File Storage", downloaded online on Jul. 3, 2020, 4 pages. <https://git-lfs.github.com/>.
"Manage Compliance with GitLab", downloaded online on Jul. 3, 2020, 5 pages. <https://about.gitlab.com/solutions/compliance/>.
Burns et al., "Version Management and Recoverability for Large Object Data", Proceedings International Workshop on Multi-Media Database Management Systems (Cat. No. 98TB100249), Aug. 7, 1998, pp. 12-19.

* cited by examiner

DATA PROFILING AND MONITORING

PRIORITY CLAIM

This application claims priority to U.S. provisional patent application No. 63/064,763, filed on Aug. 12, 2020, the disclosure of which is incorporated by reference in its entirety.

BACKGROUND

The importance of corporate data management has increased significantly in recent times. Furthermore, with the continuous increase in the volume of data and data regulations, tasks such as data monitoring, dataset version control, and data evaluation for compliance with user-defined parameters, have become more tedious and resource-intensive. Currently, dataset version control systems lack the intelligence to detect data errors arising due to non-compliance with corporate data rules or other predefined rules. Additionally, tools that perform rudimentary monitoring of the data for compliance with the corporate data rules may lack evaluation for dataset version control, thereby requiring human input for determining the appropriate dataset version for evaluation. Further, various datasets such as those relevant for software development may be binary large object files, which are not code-level files, but digital instances that do not allow for code level change detection.

Presently, the ability to regulate datasets such as business intelligence files and other binary large object files relies heavily on human intervention to identify relevant dataset version and subsequent conformation of the dataset version with various rules and data regulations. There is therefore a requirement for a system that may detect data patterns from various dataset versions and automatically identify the relevant dataset version of a dataset. Additionally, there is a requirement for a system that may automatically evaluate the relevant dataset version of the dataset for conformation with various corporate governance rules.

Accordingly, a technical problem with currently available data monitoring processes is that they may be inefficient and/or inaccurate. There is therefore a requirement for a data monitoring and evaluation system, which may perform dataset version control and subsequent evaluation for conformation with datasets of various regulations in an automated manner.

DETAILED DESCRIPTION

Figure 1:
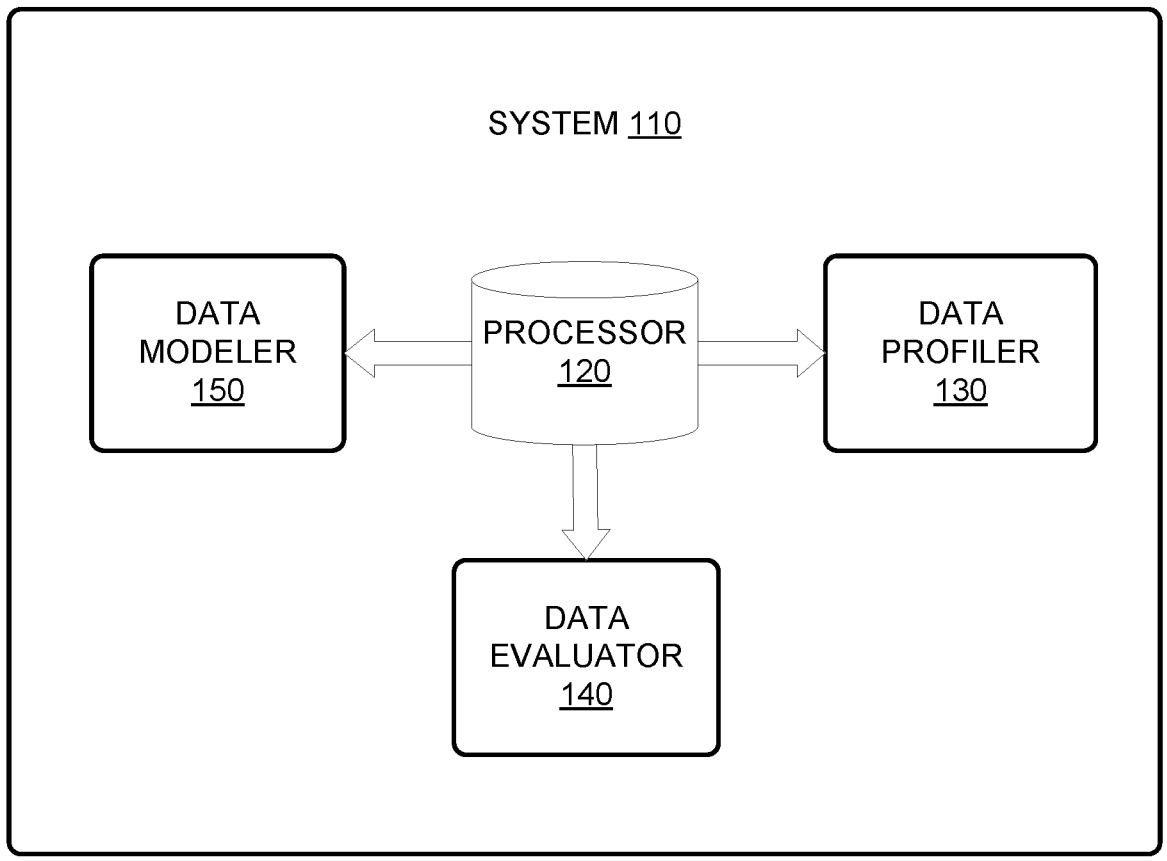
FIG. 1 illustrates a data profiling and monitoring system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes systems and methods for data profiling and evaluation. A data profiling and monitoring system (DPMS) hereinafter referred to as "system" may be used for automated assessment of corporate data, such as file version monitoring, adherence to corporate standards, and the like. For example, the system may be used to automatically check if a data record may conform to various regulations associated with a corporate environment, such as, for example, governance, risk, security, and/or other compliance regulations. The system may automate monitoring, versioning, and archiving of working corporate files such as business intelligence files.

The system may be implemented on a user's computing device or in a remote server instance for monitoring for file changes at pre-determined intervals in the business intelligence files or folders that are determined to contain working files. A user of the system may determine various rule sets for the system to monitor the files at predetermined intervals. The system may monitor for file changes in pre-determined folder locations including but not limited to the World Wide Web, a network, various local databases such as local folders, Web share, SharePoint®, email archive, and the like. Additionally, the system may monitor for file changes in pre-determined folder locations such as various cloud platforms such as Amazon Web Services® (AWS), Google Cloud Platform® (GCP), Azure®, and the like. The system may detect a change to a file and save the file at a specific location. The system may assign a version control number such as "DEV-##-DATE-AuthorEID" to the file. The system may upload the files with the change and version control number to a data repository. Subsequently, the system may evaluate the files in the repository for compliance with rulesets as defined by the user. The files that may conform to the rulesets may be automatically approved by the system. Further, the system may alert a user when a file may not conform to the ruleset defined by the user.

The system may include a processor coupled to a data profiler, a data evaluator, and a data modeler. The data profiler may receive a query from a user. The query may indicate a data modeling requirement associated with a data record. The data profiler may obtain target data from a data source associated with the data modeling requirement. The target data may include a plurality of data presentations associated with the data record. The data profiler may identify a plurality of attributes associated with the data record. Each of the plurality of attributes may include a measurable parameter associated with the data record. The measurable parameter may be used to compare the plurality of data presentations associated with the data record. The data profiler may map each of the plurality of attributes with each of the plurality of data presentations for identifying a data presentation modification associated with each of the plurality of data presentations. The data presentation modification may be indicative of a change in the corresponding data presentation as compared to the data record. The data profiler may analyze the data presentation modification associated with each of the plurality of data presentations to identify a principal data presentation associated with the data record.

The data evaluator may determine the conformity of the principal data presentation to a rule associated with the data modeling requirement to create a principal data record. The principal data record may comprise the principal data presentation conforming to the rule. The data modeler may determine the conformity of the principal data record to a record acceptance parameter associated with the data modeling requirement. The data modeler may generate a data modeling result comprising the principal data record conforming to the record acceptance parameter. The data modeler may implement a data modeling action relevant for processing the query based on the data modeling result. The data modeling action may be associated with determining the principal data record conforming to the record acceptance parameter to the user.

Accordingly, the system may provide an optimized outcome of a data modeling process and facilitates in making the tedious task of dataset versioning and evaluation more effective. The system may be configured to support human decision making for processing corporate files requiring stringent compliances such as those related to governance, risk, security, and corporate regulations. Because the system may capture all relevant elements (processes and/or features) of a file and the subsequent version analysis of the file may be performed based on data change detection, the analysis, and the resulting data evaluation may be substantially free from errors.

FIG. 1 illustrates a system 110 for data monitoring and evaluation, according to an example implementation of the present disclosure. In an example, the system 110 may include a processor 120. The processor 120 may be coupled to a data profiler 130, a data evaluator 140, and a data modeler 150.

The data profiler 130 may receive a query from a user. The query may indicate a data modeling requirement associated with a data record. The data modeling requirement may be related to developing and publishing a document such as a report in an enterprise environment. In an example, the data modeling requirement may be related to creating a document in an enterprise environment by automatically amalgamating modifications made by a plethora of users and automatically evaluating the document for compliance with corporate governance regulations. In an example, the data modeling requirement may be related to implementing an automated version control on corporate files such as binary large object files, which may not be liable to code level change detection.

The data profiler 130 may obtain target data from a data source associated with the data modeling requirement. The target data may include data that may be used for creating a document in the enterprise environment. In an example, the target data may be various data segments that may be created by an organization for processing the data modeling requirement. In an example, the target data may be various data segments accessible to an organization. The data source may include various internal and external databases that may be accessible to an organization. For example, the data source may include various web-based databases accessible to an organization. Additionally, the data source may include various network-based databases accessible to an organization. The target data may include a plurality of data presentations (also referred to as data presentations hereinafter) associated with the data record. The data presentations may be various versions of the data record. The data presentations may be created by multiple users at multiple times adhering to multiple corporate governance regulations.

The data profiler 130 may identify a plurality of attributes associated with the data record. Each of the plurality of attributes may include a measurable parameter associated with the data record. The measurable parameter may be used to compare the plurality of data presentations associated with the data record. For example, the plurality of attributes may include metadata associated with the data record. The plurality of attributes may include various other measurable parameters such as user credentials, user security clearance, a time of an iteration in a document, metadata associated with the iteration in the document, and the like. In an example, the data profiler may automatically identify the plurality of attributes for a particular data record based on historical data associated with similar data records. In an example, the data profiler 130 may identify the plurality of attributes based on the target data. The data profiler 130 may identify the plurality of attributes for each of the data presentations associated with the data record. In an example, the data profiler 130 may identify the same set of attributes for each of the data presentations associated with the data record. The data profiler 130 may compare the measurable parameters such as metadata associated with the data record, user credentials, user security clearance, a time of an iteration in a document, metadata associated with the iteration in the document, and the like for comparing the data presentations with each other.

The data profiler 130 may map each of the plurality of attributes with each of the data presentations for identifying a data presentation modification associated with each of the plurality of data presentations. The data presentation modification may be a change in a data presentation as compared to other data presentations associated with the same data record. In an example, the data profiler 130 may map and compare the measurable parameters identified for each of the data presentations associated with the data record with each other. In an example, measurable parameters for a first data presentation may be mapped with measurable parameters for a second data presentation to identify the data presentation modification in both the first data presentation and the second data presentation. The first data presentation and the second data presentation may be associated with the data record. For example, metadata associated with an iteration in the first data presentation may be mapped with the metadata associated with an iteration in the second data presentation. Similarly, the data profiler 130 may map various measurable parameters such as metadata associated with each of the data presentations to identify the data presentation modification for each data presentation. The data presentation modification may be indicative of a change in the corresponding data presentation as compared to the data record.

The data profiler 130 may analyze the data presentation modification associated with each of the data presentations to identify a principal data presentation associated with the data record. The analysis may include comparing metadata such as MD5 hash for each of the data presentations. The principal data presentation may be the most updated data presentation associated with the data record. In an example, the principal data presentation may be the data presentation that may be approved by a user with the highest security clearance. In an example, the principal data presentation may be the data presentation that may be iterated most recently by a particular user. In an example, the data profiler 130 may analyze the data presentation modification associated with the data presentations for a particular user to identify the principal data presentation for that particular user. For sake of brevity and technical clarity few exemplary embodiments of the principal data presentation are presented herein, however, it should be clear to a person skilled in the art that the principal data presentation may include the data presentation associated with the data record that may be most relevant to processing the data modeling requirement.

The data evaluator 140 may identify a rule associated with the data modeling requirement. The rule may refer to a set of instructions that may be critical for ensuring compliance of the data record in accordance with norms of corporate governance. Additionally, the rule may be a set of compliance regulations critical to processing the data modeling requirement. For example, the rule may include security credential parameters of users who may access the data record. The rule may include various data risk parameters that may be used to check any risk that the data record may be exposed to. The data evaluator may receive rule data associated with at least one rule from a pre-existing library. The rule data may include data that may be used by the data evaluator to map with the data record to check adherence to various regulations. The rule data may be associated with at least one of a governance issue, a data risk, a compliance issue, and a security issue associated with the data record. The pre-existing library may be coupled to the processor. Further, the data evaluator may update the pre-existing library based on an update in the rule data. In an example, the rule data may include metadata associated with the rule. In accordance with various embodiments of the present disclosure, the user may provide a custom set of rules to the data evaluator 140 apart from the rule that may be identified from the pre-existing library.

The data evaluator 140 may determine the conformity of the principal data presentation to the rule to create a principal data record. The data evaluator 140 may map the metadata associated with the rule data with the metadata associated with the principal data presentation to determine the conformity of the principal data presentation to the rule. The data evaluator 140 may create the principal data record using the principal data presentation that may be corroborating with the rule. The principal data record may include the principal data presentation conforming to the rule.

The data modeler 150 may identify a record acceptance parameter associated with the data modeling requirement from a pre-existing parameter database comprising record acceptance parameter data. The record acceptance parameter may be a set of measurable parameters that may be critical for user acceptance of the data record. The record acceptance parameter may include corresponding record acceptance parameter data. For example, the record acceptance parameter data may be metadata associated with the record acceptance parameter. In an example, the data modeler 150 may identify the record acceptance parameter from the pre-existing parameter database. In an example, the modeler 150 may obtain at least one of the record acceptance parameter from a user of the system 110. In an example, the system 110 may be configurable so that at least one of the record acceptance parameter may be automatically identified by the data modeler 150 from the pre-existing parameter database and at least one of the record acceptance parameter may be obtained from a user of the system 110.

The data modeler 150 may determine the conformity of the principal data record to the record acceptance parameter. The data modeler 150 may map the metadata included in the record acceptance parameter data with the principal data record to determine the aforementioned conformity. The data modeler 150 may generate a data modeling result comprising the principal data record conforming to the record acceptance parameter. The modeler 150 implement a data modeling action relevant for processing the query based on the data modeling result. The data modeling action may be associated with determining the principal data record conforming to the record acceptance parameter. The data modeling action may resolve the data modeling requirement.

Figure 2:
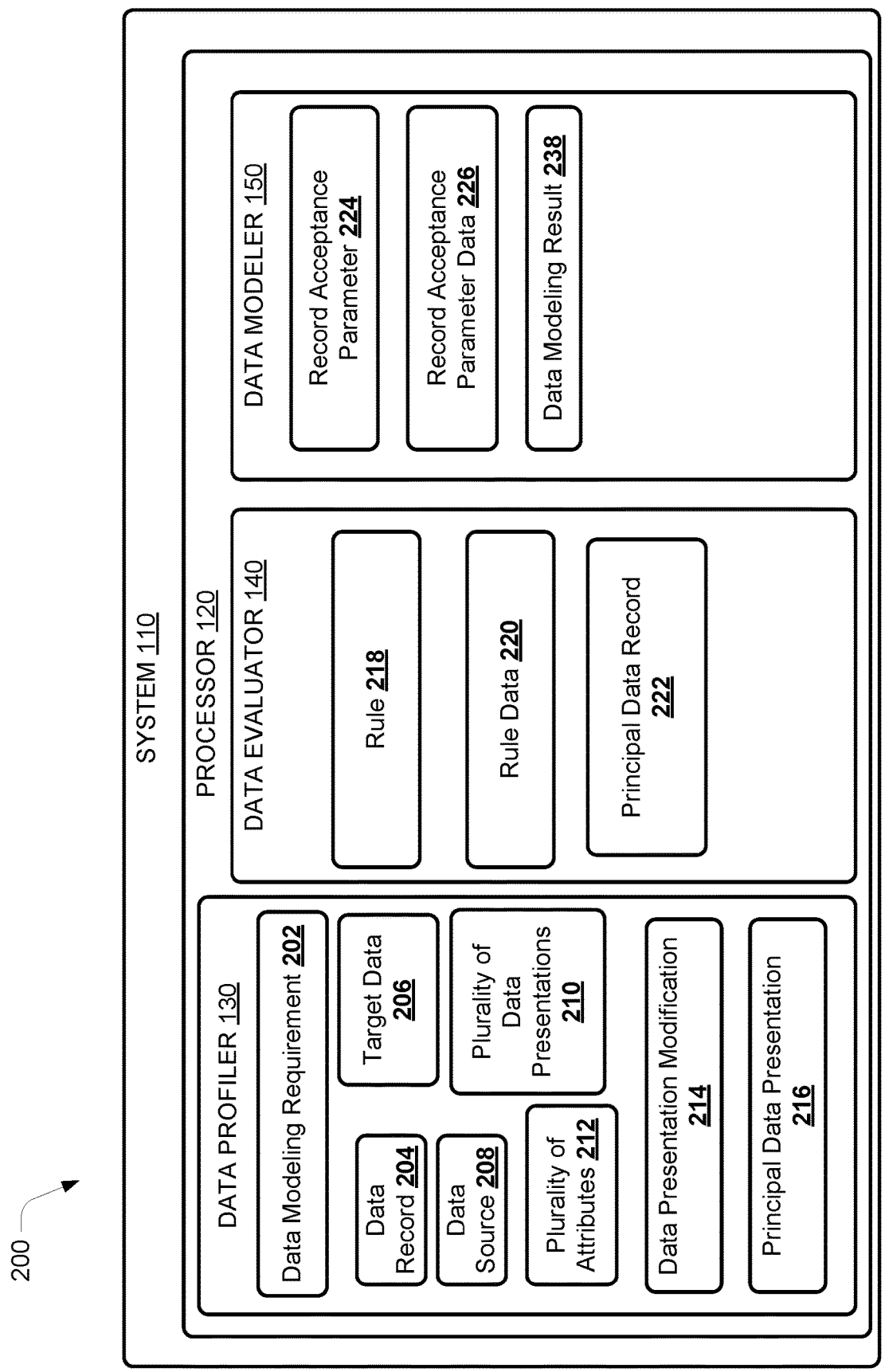
FIG. 2 illustrates various components of the data profiling and monitoring system, according to an example embodiment of the present disclosure.

FIG. 2 illustrates various components of a data profiling and monitoring system 200, according to an example embodiment of the present disclosure. The system 200 may be an exemplary embodiment of the system 110 described with respect to the description for FIG. 1. Any of the components of the system 110 may be deployed by the system 200 and may be referred to for describing the system 200. In an example embodiment, the system 200 may include the processor 120. The processor 120 may be coupled to the data profiler 130, the data evaluator 140, and the data modeler 150.

The data profiler 130 may receive the query including a data modeling requirement 202 associated with a data record 204. The data record 204 may be a file such as a business intelligence (BI) file associated with a corporate environment. The data modeling requirement 202 may be a requirement to monitor and evaluate the data record 204 for checking the conformance of the data record 204 contents with the requirements of a user and the corporate environment. The data profiler 130 may obtain target data 206 from a data source 208 associated with the data modeling requirement 202. The data source may be various visualization and programming interfaces that may be used to create the data record 204.

The target data 206 may include a plurality of data presentations 210 (referred to as data presentations 210 hereinafter) associated with the data record 204. The data presentations 210 may be various versions of the data record 204. For example, a single user or multiple users may iterate the data record 204 various times, thereby leading to various versions of the same data record 204. The data profiler 130 may identify a plurality of attributes 212 associated with the data record 204. Each of the plurality of attributes 212 may include a measurable parameter associated with the data record 204. For example, the attributes may include identification of metadata such as a hash, e.g., an MD5 hash, associated with each dataset version. The data profiler 130 may map each of the plurality of attributes 212 with each of the data presentations 210 for identifying a data presentation modification 214 associated with each of the data presentations 210. For example, the MD5 hash for each of the data presentations 210 may be compared to detect a change in each data presentations 210. The data profiler 130 may identify the data presentation modification 214 for each of the data presentations 210. The data presentation modification 214 may be indicative of a change in the corresponding data presentation as compared to the data record 204.

The data profiler 130 may evaluate the data presentation modification 214 associated with each of the data presentations 210 to identify a principal data presentation 216 associated with the data record 204. The principal data presentation 216 may be the most updated version of the data record 204. In an example, the principal data presentation 216 may be the most recent version of the data record 204. The principal data presentation 216 may be used for further processing by the system 110. The data profiler 130 may compare the data presentation modification 214 for each of the data presentations 210 with the data record 204 to identify the principal data presentation 216. For example, the data profiler 130 may compare the MD5 hash for each of the data presentations 210 with the MD5 hash for the data record 204 to identify the principal data presentation 216.

The data profiler 130 may evaluate the data presentation modification 214 associated with each of the plurality of data presentations 210 to create a data presentation repository. The data profiler 130 may map each of the plurality of data presentations 210 in the data presentation repository with the data record to identify the principal data presentation 216. The data profiler 130 may designate a unique identifier to each of the plurality of data presentations 210 in the data presentation repository based on corresponding data presentation modification 214 associated with each of the plurality of data presentations 210 (explained in detail by way of the description for the subsequent Figs).

The data evaluator 140 may identify a rule 218 associated with the data modeling requirement 202. The data evaluator 140 may receive rule data 220 associated with the rule 218 from a pre-existing library. The pre-existing library may be coupled to the processor 120. In an example, the rule data 220 present in the pre-existing library being associated with at least one of a governance issue, a data risk, a compliance issue, and a security issue for the data record 204. In an example, rule 218 may include a custom ruleset designed by a human developer for a particular data record 204. The data evaluator 140 may determine the conformity of the principal data presentation 216 with the rule 218 to create a principal data record 222. The principal data record 222 may comprise the principal data presentation 216 conforming to the rule. The data evaluator 140 may detect nonconformity of the principal data presentation 216 to the rule 218. The data evaluator 140 may designate the principal data presentation 216 inappropriate for resolving the data modeling requirement 202. The data evaluator 140 may send the principal data presentation 216 to the data modeler 150 after ensuring conformance with the rule 218.

The data modeler 150 may identify a record acceptance parameter 224 associated with the data modeling requirement 202 and receive record acceptance parameter data 226 associated with the record acceptance parameter from a pre-existing library coupled to the processor. In an example, the record acceptance parameter 224 may be a set of requirements stipulated by a user for a particular data record 204. The record acceptance parameter 224 may also include various parameters critical to the success of a digital initiative associated with the data modeling requirement 202. The record acceptance parameter 224 may be provided by an authorized person. The data modeler 150 may determine the conformity of the principal data record 222 with the record acceptance parameter 224. The data modeler 150 may detect nonconformity of the principal data record 222 to the record acceptance parameter 224. The data modeler 150 may designate the principal data record 222 inappropriate for resolving the data modeling requirement 202. The conformance with the rule 218 and with the record acceptance parameter 224 as determined by the data evaluator 140 and the data modeler 150 may be explained in detail by way of the description for subsequent Figs.

The data modeler 150 may generate a data modeling result 238 if the principal data record 222 may be conforming to the record acceptance parameter 224. The data modeling result 238 may include the production of the target record 204 in compliance with the rule 218 and the record acceptance parameter 224. The data modeling result 238 may be generated after the system 110 may automatically check the data record 204 for compliance with the rule 218 and the record acceptance parameter 224. The data modeler 150 may implement a data modeling action relevant for processing the query based on the data modeling result 238. The data modeling action may be associated with determining the principal data record 222 conforming to the record acceptance parameter 224 to the user. In an example, the data modeling action may include automatically determining and producing the principal data record 222.

Figure 3:
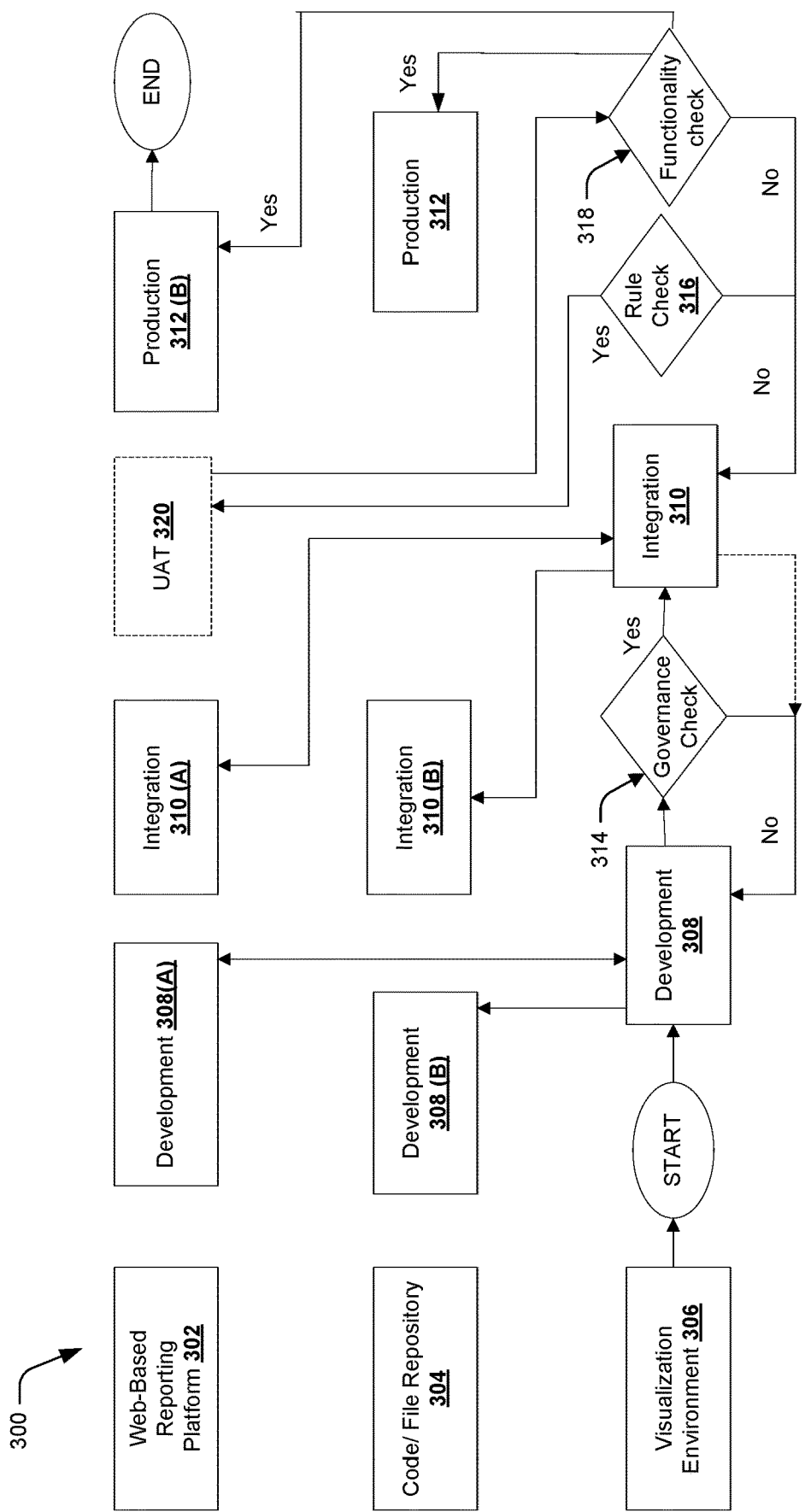
FIG. 3 illustrates a flow diagram for automated visualization and enhanced data development for data profiling and monitoring, according to an example embodiment of the present disclosure.

FIG. 3 illustrates a flow diagram 300 for automated visualization and enhanced data development for data profiling and monitoring, according to an example embodiment of the present disclosure. The flow diagram 300 may include a web-based reporting platform 302, a file repository 304, and a visualization environment 306. Further, the flow diagram 300 may analyze a dataset (also referred to as a file hereinafter) at a development stage 308, an integration stage 310, and a production stage 312. The system 110 may initiate the process of file monitoring and evaluation in the visualization environment 306 and the process may conclude with the production stage 312 in the web-based reporting platform 302. The production stage 312 may include the generation of the data modeling result 238.

The development stage 308 may include a human file developer to develop a file such as a file related to business intelligence (BI). The human file developer may publish the file onto the web-based reporting platform 302. The publishing of the file onto the web-based reporting platform 302 may be referred to as a development stage 308 (A). In an example, various human file developers may work on the same file and publish the same onto the web-based reporting platform 302. The system 110 may create the file repository 304 to monitor each file published by each human file developer onto the web-based reporting platform 302. Further, the system 110 may implement an automatic version control at the file repository 304. The files may be automatically version controlled and stored in the file repository using change detection and folder monitoring processes. The version-controlled files stored in the file repository 304 may be referred to as being at a development stage 308 (B). In accordance with various embodiments of the present disclosure, various BI files may be binary large object files which may not be code-level files but digital instances that do not allow for code level change detection. The files may be automatically version controlled by the system 110 and stored in the file repository.

System 110 may implement automated version control based on monitoring files at pre-determined intervals. For example, as a developer may build and iterate on a file or a series of files, they may be monitored at predetermined intervals by the system 110. The system 110 may detect changes such as in the MD5 hash file metadata. A change may trigger an automated upload of the file or series of files to a pre-determined location such as a Web, a network, a local file folder, and the like. These saved files may be assigned a version control number. The system 110 may automatically archive and version the large digital instance(s) as a complete file to be referenced later. Further, the system 110 may archive and version control a file that may be required by multiple software interfaces. For example, there may be additional software such as Simple Query Language (SQL™) files, R Studio™ files, Alteryx™ integration that may require a change in the file to support the file. The system 110 may add these files as a part of the same version and instance. For example, a dashboard such as the visualization environment 306 may require three different software platforms during development, these three files for each of these platforms may be version controlled and archived together respectively by the system 110.

The system 110 may implement a governance check 314 for conformation with the various rules specified by a user. The conformation with the rules may be needed to permit a file to pass through to the integration stage 310. The governance check 314 may include various evaluations for addressing issues such as governance, compliance, information security matters, and the like. In an example, the automated rule check may require integration with various rule engines such as Archer™, Collibra™, and the like. In accordance with various embodiments of the present disclosure, the governance check 314 may be implemented automatically by the system 110. In an example, the system 110 may be configurable to implement the governance check 314 at pre-determined intervals. In an example, the pre-determined intervals may be specified by a user of the system 110. In an example, wherein the file may not pass the governance check 314 affirmatively, the file may be returned by the system 110 to the development stage 308, wherein the processes mentioned by the development stage 308 (A) and the development stage 308 (B) may be implemented. The file may remain in either of the development stage 308, the development stage 308 (A), and the development stage 308 (B) until the file may pass the governance check 314.

The integration stage 310 may be implemented after the file may pass the governance check 314. The integration stage 310 may include a human file developer to integrate various files after the governance check 314. The human file developer may publish the integrated file onto the web-based reporting platform 302. The publishing of the file onto the web-based reporting platform 302 may be referred to as an integration stage 310 (A). In an example, various human file developers may work on integrating the same file and publish the same onto the web-based reporting platform 302. The system 110 may create the file repository 304 to monitor each integrated file published by each human file developer onto the web-based reporting platform 302. Further, the system 110 may implement the automated version control (as explained above) at the file repository 304. The files may be automatically version controlled and stored in the file repository 304 using change detection and folder monitoring processes. The version-controlled files stored in the file repository 304 may be referred to as being at an integration stage 310 (B).

The system 110 may implement a rule check 316 for conformation with the various rules specified by a user. The conformation with the rules may be needed to permit a file to pass through to a User Acceptance Testing (UAT) stage 320. The rule check 316 may include various evaluations to address issues such as governance, compliance, and information security matters. In an example, automated rule checks may require integration with rule engines such as Archer™ Collibra™, and the like. In accordance with various embodiments of the present disclosure, the rule check 316 may be implemented automatically by the system 110. In an example, the system 110 may be configurable to implement the rule check 316 at pre-determined intervals. In an example, the pre-determined intervals may be specified by a user of the system 110. The UAT stage 320 may include a functionality check 318, wherein a user may employ the system 110 as a final check of functionality and requirements that must be met by a file before sending the same to the production stage 312. In an example, wherein the file may not pass the rule check 316 and the functionality check 318 affirmatively, the file may be returned by the system 110 to the integration stage 310, wherein the processes mentioned above relating to integration stage 310 (A) and the integration stage 310 (B) may be implemented. The file may remain in either of the integration stage 310, the integration stage 310 (A), and the integration stage 310 (B) until the file may pass the rule check 316 and the functionality check 318.

The file may be required to pass both the rule check 316 and the functionality check 318 affirmatively before being sent to the production stage 312. The production stage 312 may include the automated version control of the files passing the rule check 316 and the functionality check 318. The system 110 may store the automatically versioned files onto the file repository 304. The files may be referred to be at the production stage 312 at the file repository 304. The system 110 may push the file to a production stage 312 (B) after the file has met all requirements stipulated by a user. The production stage 312 (B) leads to the generation of a file meeting the requirements of the user.

The evaluations included in the governance check 314, the rule check 316, and the functionality check 318 may include assessing the file for the conformation with the rule 218 and the record acceptance parameter 224. For sake of brevity and technical clarity the rule 218 and the record acceptance parameter 224 may also be collectively referred to as the ruleset hereinafter. A custom ruleset may be programmed directly into the pre-existing library associated with the system 110. The custom ruleset may be defined and governed by an Information Technology (IT) governing council or a human developer responsible for the security of business intelligence files. Additionally, various rules from external tools may be queried and ingested by the system 110 via an Application Programming Interface (API) or similar file upload with rules not dissimilar to router or firewall configuration tools. The system 110 may monitor the interaction between the file tester, the web-based file, and the data sets accessed by the web-based instance of the file. The system 110 will automatically test against the ruleset to ensure the file queried and displayed complies with the ruleset. For example, the system 110 may ensure that unauthorized personnel cannot view sensitive human resource info. The governance check 314, the rule check 316, and the functionality check 318 may act as an intermediary between the requesting file and the dataset to read an unencrypted string of information for compliance purposes.

Figure 4:
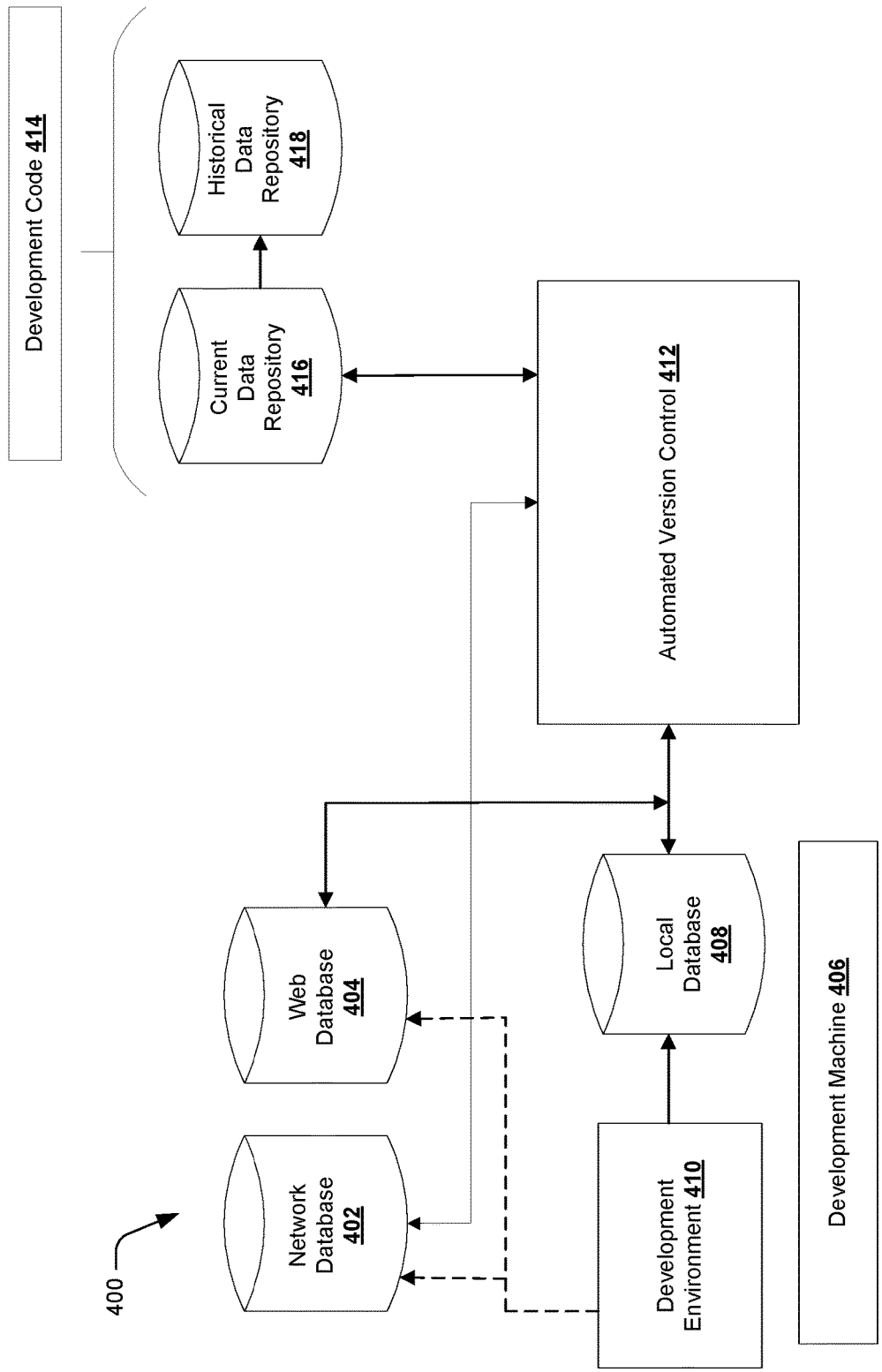
FIG. 4 illustrates a technical architecture for performing an automated version control at a data development stage for data profiling and monitoring, according to an example embodiment of the present disclosure.

FIG. 4 illustrates a technical architecture 400 for performing an automated version control at a data development stage for data profiling and monitoring, according to an example embodiment of the present disclosure. In an example, the data development stage may be the development stage 308, the development stage 308 (A), or the development stage 308 (B). The technical architecture 400 may illustrate the implementation of the automated version control for the data record 204. The technical architecture 400 may include a network database 402 and a web database 404. The network database 402 and the web database 404 may be used by a user of the system 110 for accessing the various tools, components, and information that may be used for creating the data record 204. The network database 402 and the web database 404 may be the data source 208. The technical architecture 400 may include a development machine 406. The development machine 406 may be a system used by the user for creating the data record 204. The development machine 406 may include a development environment 410 and a local database 408. The development environment 410 may be in communication with the network database 402 and the web database 404. Further, the development environment 410 may be in communication with the local database 408. In an example, the local database 408 may be the target data 206. In an example, the local database may further include the data presentation repository. The data profiler 130 may analyze the data presentation modification 214 associated with each of the data presentations 210 to store in the data presentation repository.

The development environment 410 may be used to create the target data 206. The target data 206 may include the data presentations 210 associated with the data record 204. The data presentations 210 may be different versions of the data record 204. The data presentations 210 may be created by different users while creating the data record 204. The data presentations 210 may be created by a single user at different time intervals. In an example, the data presentations 210 may include various versions of the data record 204 created as a result of the governance check 314, the rule check 316, and the functional check 318. Additionally, the data profiler 130 may map each of the data presentations 210 in the data presentation repository with the data record 204 to identify the principal data presentation 216. For example, the data profiler 130 may compare the MD5 hash for each of the data presentations 210 in the data presentation repository with the MD5 hash for the data record 204 to identify the principal data presentation 216. The system 110 may implement an automated version control 412 on the contents stored in the local database 408. For implementing the automated version control 412 the data profiler 130 may identify the plurality of attributes 212 associated with the data record 204. For example, the attributes may include identification of metadata such as a hash, e.g., an MD5 hash, associated with each version of the data record 204.

The data profiler 130 may map each of the plurality of attributes 212 with each of the data presentations 210 for identifying the data presentation modification 214 associated with each of the data presentations 210. For example, the MD5 hash for each of the data presentations 210 may be compared to detect a change in each of the data presentations 210. The data profiler 130 may identify the data presentation modification 214 for each of the data presentations 210. The data presentation modification 214 may be indicative of a change in the corresponding data presentation from the data presentations 210 as compared to the data record 204. The automated version control 412 may be implemented by detecting the data presentation modification 214 for each of the data presentations 210 stored in the local database 408. The system 110 may store the data presentations 210 after implementing the automated version control 412 back to the local database 408. Further, the system 110 may implement the automated version control 412 on various files stored in the network database 402 and the web database 404. The implementation of the automated version control 412 may include identification of the principal data presentation 216. In an example, the data profiler 130 may designate the unique identifier to each of the data presentations 210 in the data presentation repository based on corresponding data presentation modification 214 associated with each of the plurality of data presentations 210. The unique identifier may be used by the data profiler 130 to store the data presentations 210 in the local database 408. A user of the system 110 may retrieve a relevant data presentation from the data presentations 210 using the unique identifier.

The system 110 may evaluate the data presentation modification 214 associated with each of the data presentations 210 to identify the principal data presentation 216 associated with the data record 204. In an example, the principal data presentation 216 may be the data presentation 210, which may be most recently iterated. In an example, the principal data presentation 216 may be the data presentation 210, which may have been iterated the maximum number of times. In an example, criteria for evaluating the data presentation modification 214 to identify the principal data presentation 216 may be provided by an authorized person to the system 110. For example, the criteria for evaluating the data presentation modification 214 may include a set of user credentials, a set of user authorizations, a time of an iteration made in each of the data presentations 210. Further, the criteria for evaluating the data presentation modification 214 may include the plurality of attributes 212 associated with the data record 204. In an example, the system 110 may be configurable to automatically identify the criteria for evaluating the data presentation modification 214 to identify the principal data presentation 216 based on at least one of the data presentations 210, the plurality of attributes 212, the set of user credentials, the set of user authorizations, the time of an iteration made in each of the data presentations 210, and the like.

The system 110 may pass the principal data presentation 216 to a development component 414. The development component 414 may be a component wherein, the data record 204 may be created based on the results of the implementation of the automated version control 412. The development component 414 may implement the development stage 308, the development stage 308 (A), and the development stage 308 (B). The development component 414 may include a current data repository 416 and a historical data repository 418. The current data repository 416 may include data relevant to processing the data modeling requirement 202. The historical data repository 418 may include data relevant to processing a historical data modeling requirement. The current data repository 416 may be in communication with the historical data repository 418.

Figure 5:
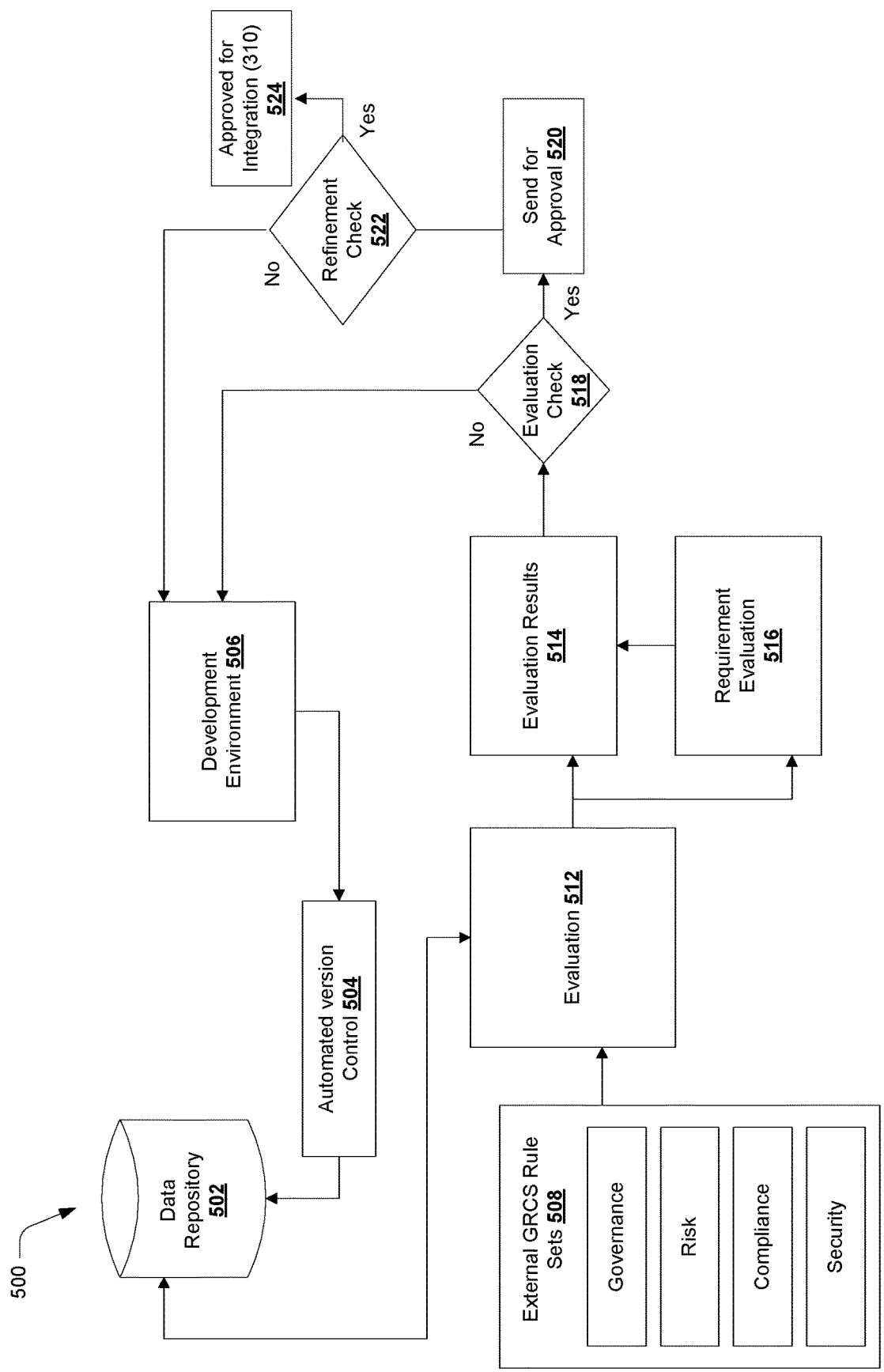
FIG. 5 illustrates a technical architecture for performing an enabled evaluation for data profiling and monitoring, according to an example embodiment of the present disclosure.

FIG. 5 illustrates a technical architecture 500 for performing an enabled evaluation for data profiling and monitoring, according to an example embodiment of the present disclosure. The system 110 may include a data repository 502, a development environment 506. The development environment 506 may be an interface for implementing the development stage 308, the development stage 308 (A), or the development stage 308 (B). The data repository 502 may be the file repository 304. The system may implement an automated version control 504 (explained above) on the files from the development environment 506 and store the version-controlled files onto the data repository 502.

Further, the system 110 includes a ruleset 508. The ruleset 508 may include rules associated with governance, risks, compliance, and security of files such as business intelligence files. The ruleset 508 may include at least one rule such as the rule 218 associated with the data modeling requirement 202. In an example, the ruleset 508 may be retrieved by the system 110 from a pre-existing library accessible to the system 110. The ruleset 508 may further include a custom ruleset that may be stored by a human developer for a particular file. In an example, the system 110 may deploy tools such as Collibra®, Archer®, and the like to ingest a custom ruleset. The custom ruleset may be provided to the system 110 by a user of the system 110. The custom ruleset may be programmed directly into the system 110. The custom rule set may be defined and governed by an IT governing council or a developer responsible for security as compliance of the data record 204 may be verified. The custom ruleset from external tools may be queried and ingested via API or similar file uploaded into the system 110. The system 110 may monitor the interaction between testing personnel, the web-based data record, and various data sets accessed by the web-based instance of the data record 204. The system 110 may automatically test against the ruleset 508 to ensure the data record 204 that may be queried and the one displayed may be in compliance with the ruleset 508. For example, unauthorized personnel may not view sensitive information belonging to an organization. The system 110 may act as an intermediary between the requesting data file such as the data record 204 and the displayed dataset to read an unencrypted string of information for compliance purposes. For example, the system 110 may handle an encrypted string as an intermediary in an encrypted exchange similar to the way that F5 network devices decrypt Hypertext Transfer Protocol Secure (HTTPS) streams for corporate security purposes. The system 110 may include rule data 220 associated with each of the rules present in the ruleset 508. The rule data 220 may include associated with at least one of a governance issue, a data risk, a compliance issue, and a security issue associated the data record 204. Further, the rule data 220 may be associated with each of the rules present in the custom ruleset.

The system 110 may implement an evaluation 512 based on the ruleset 508 on the files stored in the data repository 502. The evaluation 512 may be implemented by the system 110 to check the conformity of the principal data presentation 216 with the ruleset 508. In an example, the evaluation 512 may identify at least one rule 218 associated with the data modeling requirement 202 from the ruleset 508. In an example, the evaluation 512 may identify relevant rules associated with at least one of a governance issue, a data risk, a compliance issue, and a security issue associated the data record 204 along with relevant rules from the custom ruleset as provided by a user of the system 110.

In an example, the evaluation 512 may include governance check 314. The governance check may include checking the conformity of the principal data presentation 216 with at least one of the governance issue, the data risk, the compliance issue, and the security issue associated the data record 204 In an example, the system 110 may be configured such that an authorized personnel may trigger the evaluation 512. The evaluation 512 may include a source location for the file, applicable rules from the ruleset 508, and various applicable security tool integrations. The custom ruleset for the file may be added by the development team. In an example, the ruleset 508 may include encrypted channel use, sensitive data, internal email addresses, government addresses, pseudonymized data, administrative credentials use, and the like. In an example, the ruleset 508 may be configured as a man-in-the-middle device to capture interactions and data exchange between the file and other data sources, including the capture of cipher keys that would otherwise keep communications secure between the file platform and data set used to generate the insights.

The evaluation 512 may be launched by authorized personnel. The system 110 may begin to capture interactions and data exchange for evaluation. For example, encrypted tunnels, user identifications, databases accessed, SQL® queries, and the like. The interactions may be evaluated against integrated governance, risks, compliance, security, and the custom rulesets. Further, the system 110 may implement a requirement evaluation 516 as part of the evaluation 512. The requirement evaluation 516 may be implemented to determine if the file may conform to the user requirements. The evaluation 512 and the requirement evaluation 516 may lead to the generation of an evaluation result 514. The evaluation result 514 may include results from the governance check 314. In an example, the evaluation result 514 may include aggregation of the results from the governance check 314, the rule check 316, and the functionality check 318. The system 110 may implement an evaluation check 518 on the evaluation result 514. In an example, when the evaluation check 518 may be affirmative for the file, it may signify that the file may conform to all the requirements stipulated by the ruleset 508. The data evaluator 140 may determine the conformity of the principal data presentation 216 with the ruleset 508 to create the principal data record 222. The principal data record 222 may comprise the principal data presentation 216 conforming to the rule. In such a scenario, the file may be sent for approval as illustrated by block 520. In an example, the evaluation check 518 is negative, thereby indicating that the file does not conform to all the requirements stipulated by the ruleset 508. In such a scenario, the system 110 may designate the principal data presentation 216 as inappropriate for resolving the data modeling requirement 202 and the data record 204 may be sent back to the development environment 506 for further refinements.

The system 110 may implement a refinement check 522 on the file after the block 520. The file may be sent to the development environment 506 for further refinements if the refinement check 522 is negative and the file may be approved for the integration stage 310 if the refinement check 522 is positive. In accordance with various embodiments of the present disclosure, the refinement check 522 may be executed by authorized personnel. For the refinement check 522, the evaluation result 514 may be sent to a developer to determine if any modifications may be required. The developer may make any modifications if required, and the system 110 may implement the evaluation 512 thereafter. When any issues identified by the refinement check 522 are resolved, the evaluation result 514 and the results from the refinement check 522 may be sent to the pre-defined approvers for approval before the report being pushed to the next phase such as the integration stage 310, the integration stage 310 (A), and integration stage 310 (B). Therefore, the system 110 may provide a unified rules engine based approach for various data modeling initiatives of an organization such as Software Development Life Cycle (SDLC), wherein, automated version control and adherence to a specified set of rules may be critical to the success of the initiative. The system 110 may provide checks for governance, risk, compliance, security, or custom enterprise rules automatically in a system of systems capacity to support the SDLC in an organization.

Figure 6:
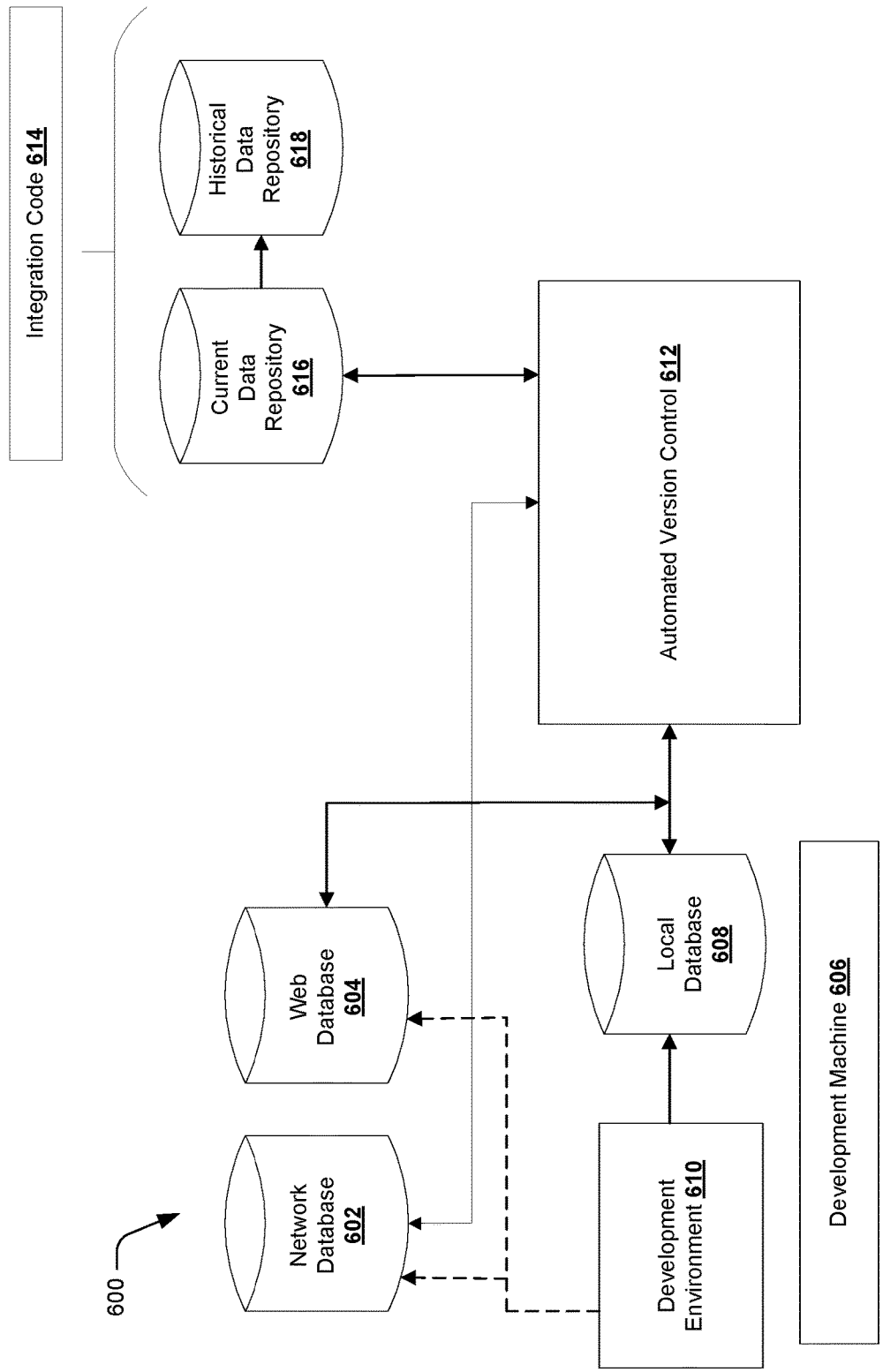
FIG. 6 illustrates a technical architecture for performing an automated version control at a data integration stage for data profiling and monitoring, according to an example embodiment of the present disclosure.

FIG. 6 illustrates a technical architecture 600 for performing an automated version control at a data integration stage for data profiling and monitoring, according to an example embodiment of the present disclosure. In an example, the data development stage may be the integration stage 310, the integration stage 310 (A), or the integration stage 310 (B). The technical architecture 600 may illustrate the implementation of the automated version control for the data record 204 that has been developed by the development component 414. Further, the architecture 600 may illustrate the implementation of the automated version control for the data record 204 that has been evaluated by the evaluation 512 and has been approved for the integration stage 310, the integration stage 310 (A), and the integration stage 310 (B) after the refinement check 522.

The technical architecture 600 may include a network database 602 and a web database 604. The network database 602 and the web database 604 may be used by a user of the system 110 for accessing the various tools, components, and information that may be used for integrating various versions of the data record 204. The technical architecture 600 may include a development machine 606. The development machine 606 may be a system used by the user for integrating various versions of the data record 204. The development machine 606 may include a development environment 610 and a local database 608. The development environment 610 may be in communication with the network database 602 and the web database 604. Further, the development environment 610 may be in communication with the local database 608. The local database 608 may be the current data repository 416. The development environment 610 may be used to integrate data present in the current data repository 416. The current data repository 416 may include the principal data record 222. In an example, the current data repository 416 may include files that have been approved for further processing by the refinement check 522. The system may implement an automated version control 612 on the contents stored in the local database 608. The automated version control 612 may be implemented similar to the automated version control 412.

In an example, during an SDLC process, there may be many files that may be processed by the development component 414 after the automated version control 412 has been implemented. The evaluation 512 may be implemented on all the files processed by the development component 414. Additionally, multiple files may be approved by the refinement check 522. These multiple files may be various versions of the principal data record 222, thereby requiring a secondary level version control such as the implementation of the automated version control 612. The system 110 may store multiple versions of the principal data record 222 after implementing the automated version control 612 back to the local database 608. Further, the system 110 may implement the automated version control 612 on various files stored in the network database 602 and the web database 604.

The system 110 may pass the principal data record 222 to an integration component 614 after implementation of the automated version control 612. The integration component 614 may be a component wherein, various versions of the principal data record 222 may be integrated based on the results of the implementation of the automated version control 612. The integration component 614 may implement the integration stage 310, the integration stage 310 (A), and the integration stage 310 (B). The integration component 614 may include a current data repository 616 and a historical data repository 618. The current data repository 616 may include data relevant to processing the data modeling requirement 202. The historical data repository 618 may include data relevant to processing a historical data modeling requirement. The current data repository 616 may be in communication with the historical data repository 618. The integration component 614 may be used by authorized personnel for integrating various versions of the principal data record 222. Additionally, various integrated versions of the principal data record 222 may be created by the authorized personnel while working on integrating all versions of the principal data record 222.

In accordance with various embodiments of the present disclosure, the system 110 may further identify a comprehensive integrated version of the principal data record 222 from amongst various versions of the principal data record 222 stored in the current data repository 616. The system 110 may evaluate each file stored in the current data repository 616 to identify a comprehensive integrated version of the principal data record 222 associated with the data record 204. In an example, the comprehensive integrated version of the principal data record 222 may be a file, which may be most recently iterated. In an example, the comprehensive integrated version of the principal data record 222 may be the file, which may have been iterated the maximum number of times. In an example, criteria for evaluating each file stored in the current data repository 616 to identify the comprehensive integrated version of the principal data record 222 may be provided by an authorized personnel to the system 110. For example, the criteria for evaluating each file stored in the current data repository 616 may include a set of user credentials, a set of user authorizations, a time of an iteration made in each of the principal data record 222. Further, the criteria for evaluating each file stored in the current data repository 616 may include the plurality of attributes 212 associated with the data record 204. In an example, the system 110 may be configurable to automatically identify the criteria for evaluating each file stored in the current data repository 616 to identify the comprehensive integrated version of the principal data record 222 based on at least one of the principal data record 222, the principal data presentation 216, the data presentations 210, the plurality of attributes 212, the set of user credentials, the set of user authorizations, the time of an iteration made in each of the data presentations 210, and the like.

Figure 7:
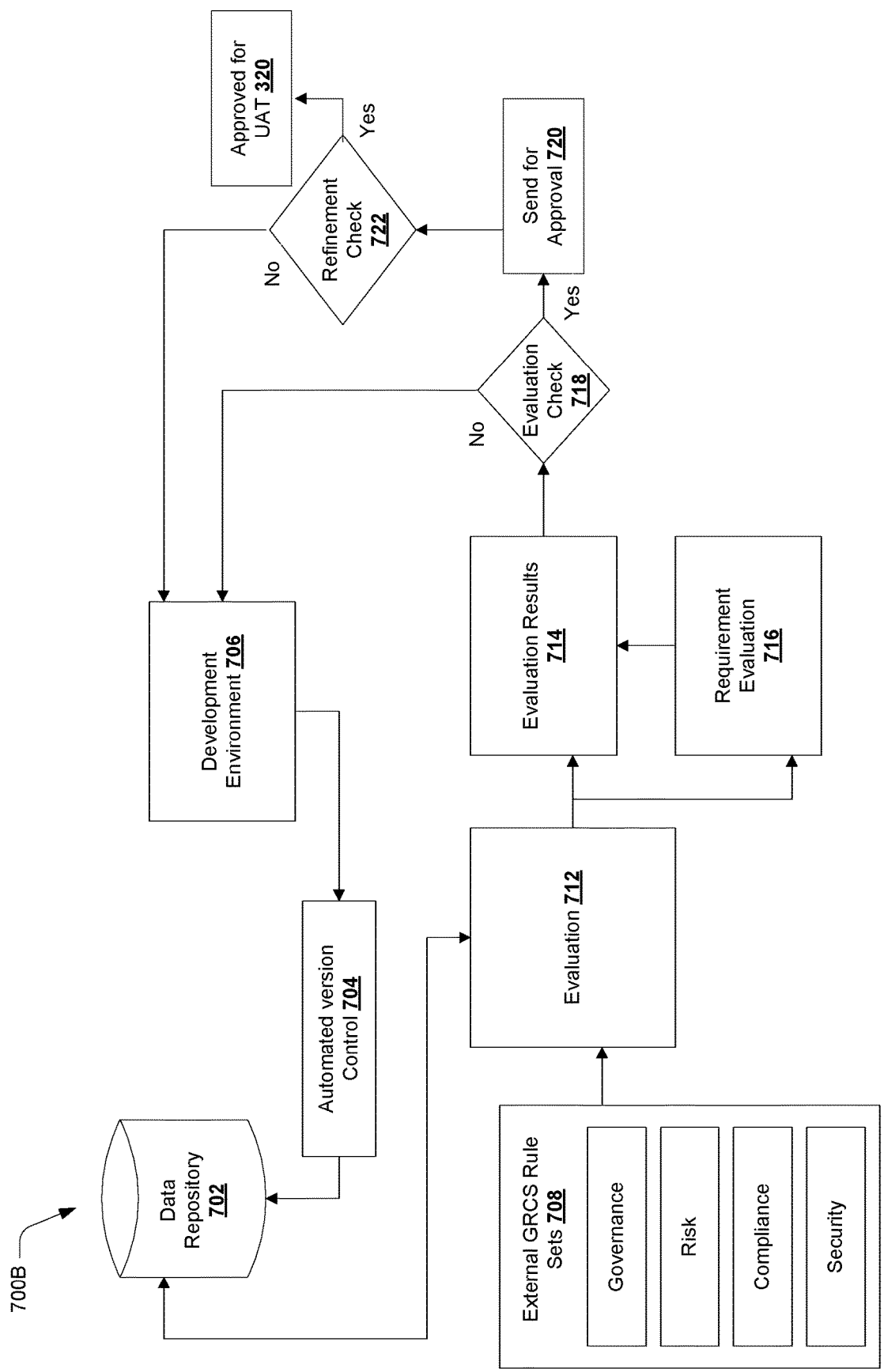
FIG. 7 illustrates a technical architecture for performing an enabled evaluation to pass through to a user acceptance testing stage for data profiling and monitoring, according to an example embodiment of the present disclosure.

FIG. 7 illustrates a technical architecture 700 for performing an enabled evaluation to pass through to a User Acceptance Testing (UAT) stage for data profiling and monitoring, according to an example embodiment of the present disclosure. In accordance with various example embodiments of the present disclosure, the UAT stage described herein may be the UAT 320. The system 110 may include a data repository 702, a development environment 706. The development environment 706 may be an interface for implementing the UAT 320. The data repository 702 may be the file repository 304. The system may implement an automated version control 704 on the files from the development environment 706 and store the version-controlled files onto the data repository 702. The automated version control 704 may be the automated version control 612.

Further, the system 110 includes a ruleset 708. The ruleset 708 may be similar to the ruleset 508. The ruleset 708 may further include the custom ruleset that may be stored by a human developer for a particular file. In an example, the system 110 may deploy tools such as Collibra®, Archer®, and the like to ingest the custom ruleset.

The system 110 may implement an evaluation 712 based on the ruleset 708 on the files stored in the data repository 702. The evaluation 712 may be implemented by the system 110 to check the conformity of the principal data record 222 with the ruleset 708. The evaluation 712 may be implemented similar to the evaluation 512 described above by the way of description for FIG. 5. The evaluation 712 may be launched by authorized personnel. The system 110 may begin to capture interactions and data exchange for evaluation. For example, encrypted tunnels, user identifications, databases accessed, SQL® queries, and the like. The interactions may be evaluated against integrated governance, risks, compliance, security, and the custom rulesets. Further, the system 110 may implement a requirement evaluation 716 as part of the evaluation 712. The requirement evaluation 716 may be implemented to determine if the file may conform to the user requirements. The evaluation 712 and the requirement evaluation 716 may lead to the generation of an evaluation result 714. The evaluation result 714 may include aggregation of the results from the rule check 316 and the functionality check 318. In an example, the rule check 316 and the functionality check 318 may check if the principal data record 222 may conform the ruleset 708.

The system 110 may implement an evaluation check 718 on the evaluation result 714. In an example, when the evaluation check 718 may be affirmative for the file, it may signify that the file may conform to all the requirements stipulated by the ruleset 708. The data evaluator 140 may determine the conformity of the principal data record 222 with the ruleset 708 to create the principal data record 222. The principal data record 222 may comprise the principal data presentation 216 conforming to the rule. In such a scenario, the file may be sent for approval as illustrated by block 720. In an example, the evaluation check 718 is negative, thereby indicating that the file does not conform to all the requirements stipulated by the ruleset 708. In such a scenario, the system 110 may designate the principal data record 222 as inappropriate for resolving the data modeling requirement 202, and the data record 204 may be sent back to the development environment 706 for further refinements.

The system 110 may implement a refinement check 722 on the file after the block 720. The file may be sent to the development environment 706 for further refinements if the refinement check 722 is negative and the file may be approved for the UAT 320 if the refinement check 722 is positive. In accordance with various embodiments of the present disclosure, the refinement check 722 may be executed by authorized personnel. For the refinement check 722, the evaluation result 714 may be sent to a developer to determine if any modifications may be required. The developer may make any modifications if required, and the system 110 may implement the evaluation 712 thereafter. When any issues identified by the refinement check 722 are resolved, the evaluation result 714 and the results from the refinement check 722 may be sent to the pre-defined approvers for approval before the report being pushed to the next phase such as the UAT 320. Therefore, the system 110 may provide a unified rules engine based approach for various data modeling initiatives of an organization such as SDLC, wherein, automated version control, seamless integration of various versions of files, seamless integration of various rule compliances and the like may be critical to the success of the initiative. The system 110 may provide checks for such integration issues automatically in a system of systems capacity to support the SDLC in an organization.

Figure 8:
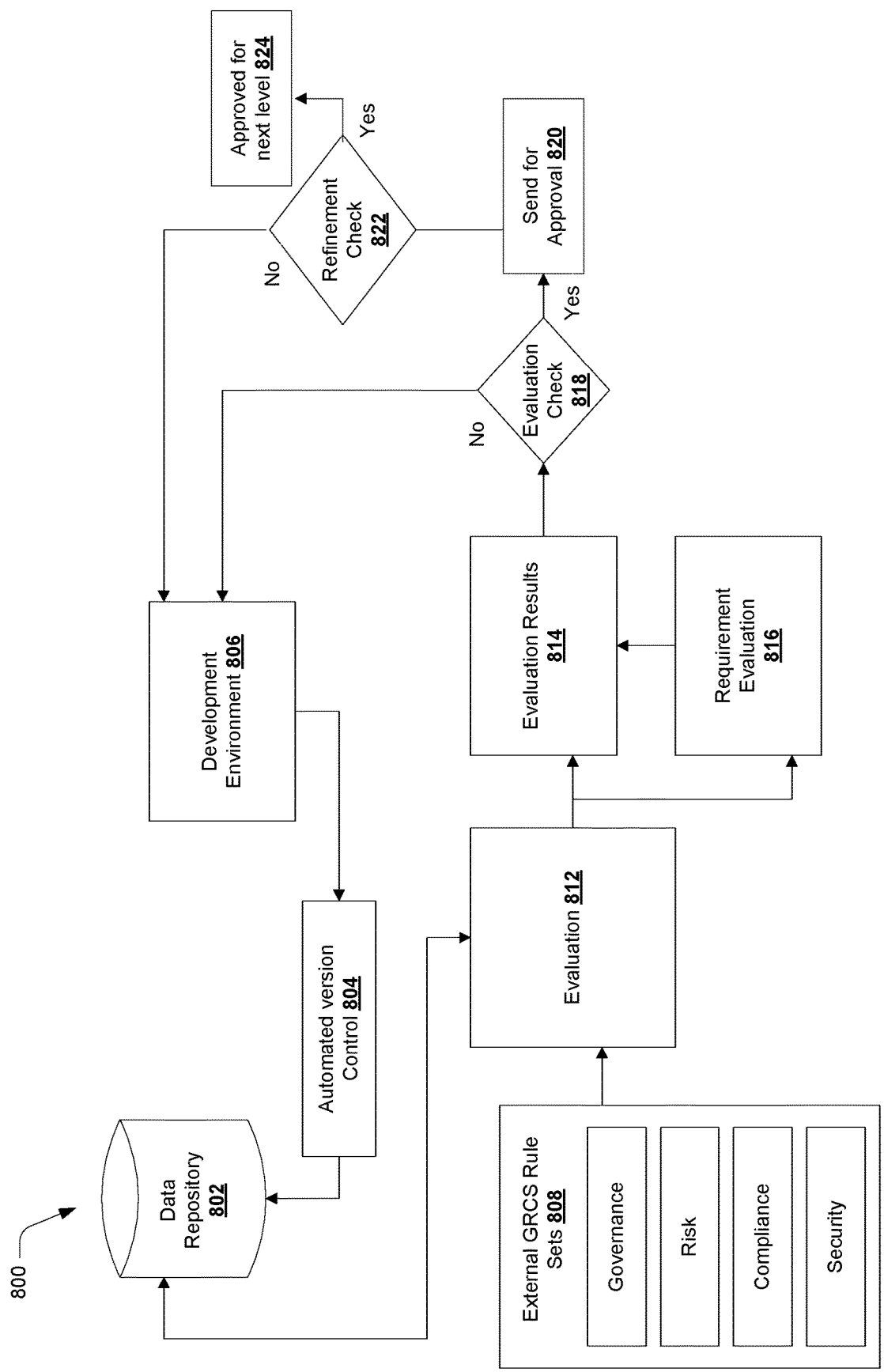
FIG. 8 illustrates a technical architecture for performing an enabled evaluation for checking functionality and requirements for data profiling and monitoring, according to an example embodiment of the present disclosure.

FIG. 8 illustrates a technical architecture 800 for performing an enabled evaluation for checking functionality and requirements for data profiling and monitoring, according to an example embodiment of the present disclosure. The system 110 may include a data repository 802, a development environment 806. The development environment 806 may be an interface for implementing the UAT 320. The data repository 802 may be the file repository 304. The system may implement an automated version control 804 on the files from the development environment 806 and store the version-controlled files onto the data repository 802. The automated version control 804 may be at least one of the automated version control 612 and the automated version control 412.

Further, the system 110 may include a ruleset 808. The ruleset 808 may be similar to the ruleset 508 and the ruleset 708. The ruleset 808 may further include the custom ruleset that may be stored by a human developer for a particular file. In an example, the system 110 may deploy tools such as Collibra®, Archer®, and the like to ingest the custom ruleset. In accordance with various embodiments of the present disclosure, the ruleset 808 may include at least one record acceptance parameter 224 associated with the data modeling requirement 202. In an example, the system 110 may automatically identify at least one record acceptance parameter 224 from the target data 206. In an example, the system 110 may identify at least one record acceptance parameter 224 from a pre-existing parameter database. The pre-existing parameter database may include the record acceptance parameter data 226. The pre-existing parameter database may be configured by authorized personnel in accordance with the data modeling requirement 202.

The system 110 may implement an evaluation 812 based on the ruleset 808 on the files stored in the data repository 802. The evaluation 812 may be implemented by the system 110 to check the conformity of the principal data record 222 with the ruleset 808. The evaluation 812 may be implemented similar to the evaluation 512 described above by the way of description for FIG. 5. The evaluation 812 may be launched by authorized personnel. The system 110 may begin to capture interactions and data exchange for evaluation. For example, encrypted tunnels, user identifications, databases accessed, SQL® queries, and the like. The interactions may be evaluated against integrated governance, risks, compliance, security, and the custom rulesets. Further, the system 110 may implement a requirement evaluation 816 as part of the evaluation 812. The requirement evaluation 816 may be implemented to determine if the file may conform to the user requirements. The evaluation 812 and the requirement evaluation 816 may lead to the generation of an evaluation result 814. In an example, the evaluation result 814 may include the principal data record 222 conforming to the record acceptance parameter 224. The evaluation result 814 may include aggregation of the results from the rule check 316 and the functionality check 318. In an example, the rule check 316 and the functionality check 318 may check if the principal data record 222 may conform to the record acceptance parameter 224.

The system 110 may implement an evaluation check 818 on the evaluation result 814. In an example, when the evaluation check 818 may be affirmative for the file, it may signify that the file may conform to all the requirements stipulated by the ruleset 808. The data evaluator 140 may determine the conformity of the principal data record 222 with the ruleset 808 to create the principal data record 222. The principal data record 222 may comprise the principal data presentation 216 conforming to the rule. In such a scenario, the file may be sent for approval as illustrated by block 820. In an example, the evaluation check 818 is negative, thereby indicating that the file does not conform to all the requirements stipulated by the ruleset 808. In such a scenario, the system 110 may designate the principal data record 222 as inappropriate for resolving the data modeling requirement 202, and the data record 204 may be sent back to the development environment 806 for further refinements.

The system 110 may implement a refinement check 822 on the file after the block 820. The file may be sent to the development environment 806 for further refinements if the refinement check 822 is negative and the file may be approved for a next level 824 if the refinement check 822 is positive. In accordance with various embodiments of the present disclosure, the next level 824 may be the production stage 312. In accordance with various embodiments of the present disclosure, the refinement check 822 may be executed by authorized personnel. For the refinement check 822, the evaluation result 814 may be sent to a developer to determine if any modifications may be required. The developer may make any modifications if required, and the system 110 may implement the evaluation 812 thereafter. When any issues identified by the refinement check 822 are resolved, the evaluation result 814 and the results from the refinement check 822 may be sent to the pre-defined approvers for approval before the report being pushed to the next phase such as the production stage 312. Therefore, the system 110 may provide a unified rules engine based approach for various data modeling initiatives of an organization such as SDLC, wherein, automated version control and adherence to a specified set of rules and user acceptance parameters may be critical to the success of the initiative. The system 110 may provide automatic checks for such rules and user acceptance parameters in a system of systems capacity to support, for example, SDLC in an organization.

Figure 9:
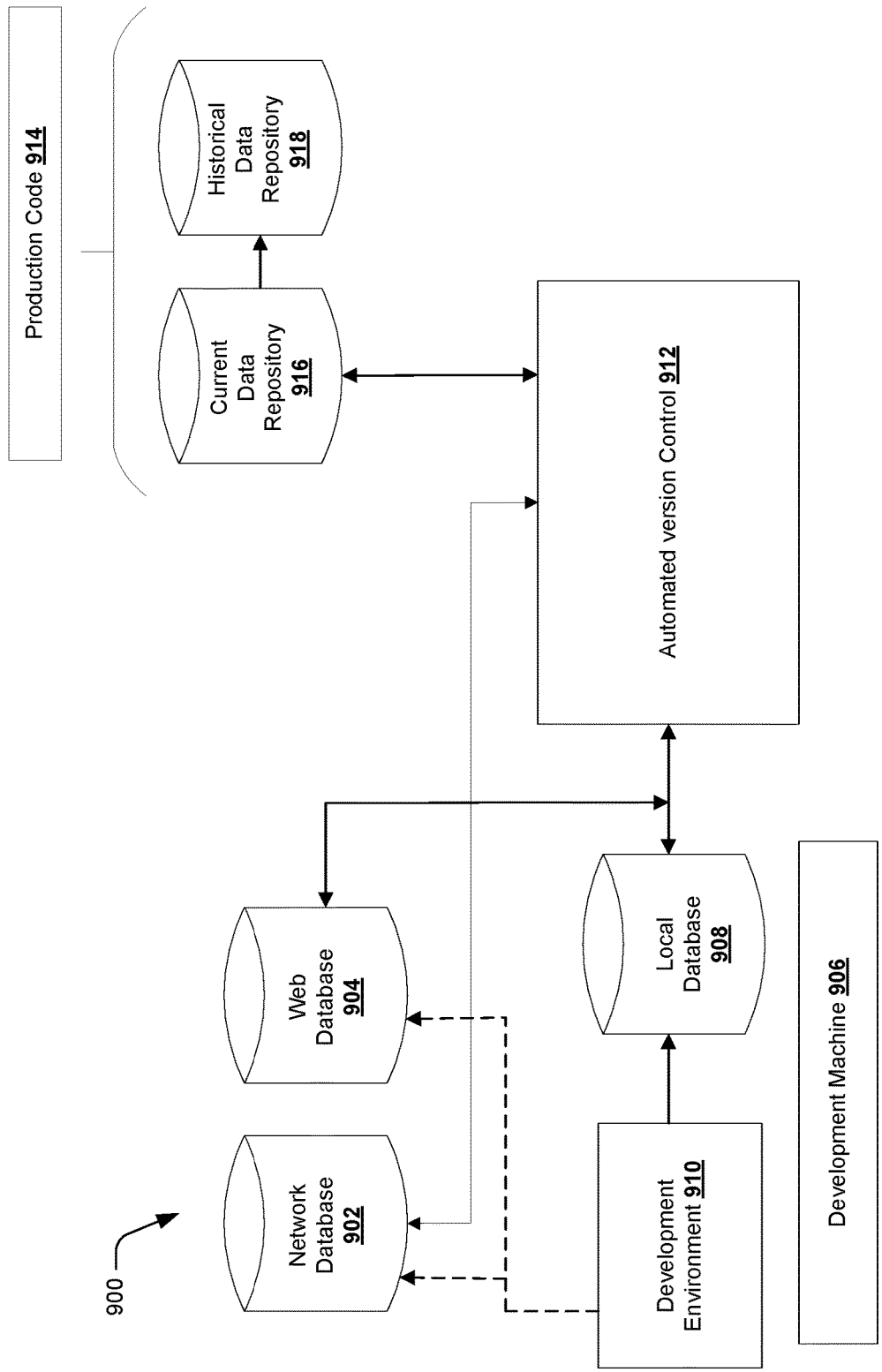
FIG. 9 illustrates a technical architecture for performing an automated version control at a production stage for data profiling and monitoring, according to an example embodiment of the present disclosure.

FIG. 9 illustrates a technical architecture 900 for performing an automated version control at a data production stage for data profiling and monitoring, according to an example embodiment of the present disclosure. In an example, the data production stage may be the production stage 312, or the production stage 312 (B). The technical architecture 900 may illustrate the implementation of the automated version control for the principal data record 222 that has been approved by the rule check 316 and the rule check 318. Further, the architecture 900 may illustrate the implementation of the automated version control for the data record 204 that has been evaluated by the evaluation 812 and has been approved for the production stage 312 and the production stage 312 (B) after the refinement check 822.

The technical architecture 900 may include a network database 902 and a web database 904. The network database 902 and the web database 904 may be used by a user of the system 110 for accessing the various tools, components, and information that may be used for integrating various versions of the data record 204. The technical architecture 900 may include a development machine 909. The development machine 909 may be a system used by the user for implementing the production stage 312 and the production stage 312 (B). The development machine 909 may include a development environment 910 and a local database 908. The development environment 910 may be in communication with the network database 902 and the web database 904. Further, the development environment 910 may be in communication with the local database 908. The local database 908 may be the current data repository 616. The system may implement an automated version control 912 on the contents stored in the local database 908. The automated version control 912 may be implemented similar to the automated version control 412. Further, the system 110 may implement the automated version control 912 on various files stored in the network database 902 and the web database 904.

The system 110 may pass the principal data record 222 to a production component 914 after implementation of the automated version control 912. The production component 914 may be a component wherein, various versions of the principal data record 222 may be produced based on the results of the rule check 316 and the functionality check 318. The production component 914 may implement the production stage 312 and the production stage 312 (B). The production component 914 may include a current data repository 916 and a historical data repository 918. The current data repository 916 may include data relevant to processing the data modeling requirement 202. The historical data repository 918 may include data relevant to processing a historical data modeling requirement. The current data repository 916 may be in communication with the historical data repository 918. The production component 914 may be used by authorized personnel for generating the data modeling result 238.

Figure 10:
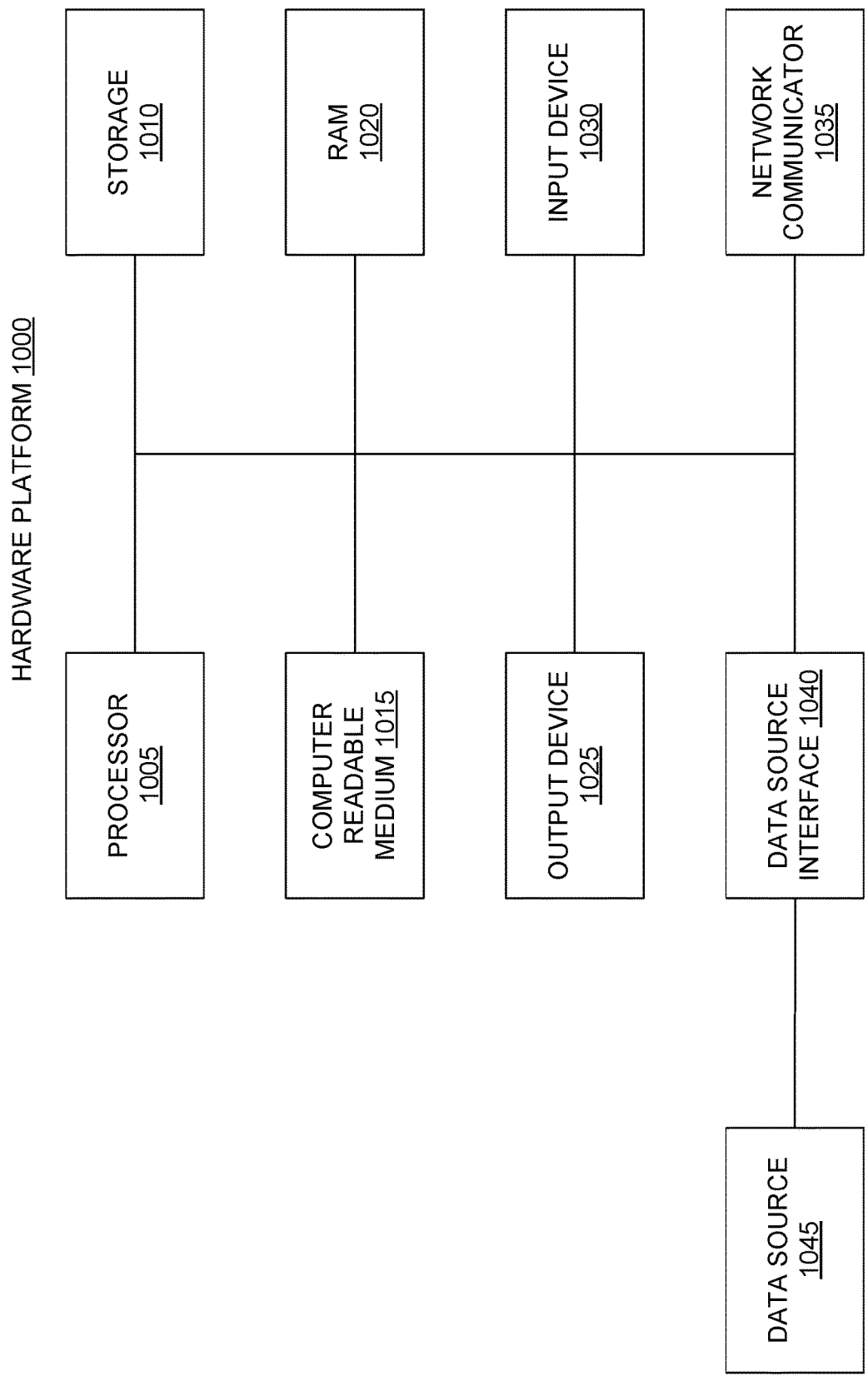
FIG. 10 illustrates a hardware platform for the implementation of the data profiling and monitoring system, according to an example embodiment of the present disclosure.

FIG. 10 illustrates a hardware platform 1000 for implementation of the system 110, according to an example embodiment of the present disclosure. For the sake of brevity, construction and operational features of the system 110 which are explained in detail above are not explained in detail herein. Particularly, computing machines such as but not limited to internal/external server clusters, quantum computers, desktops, laptops, smartphones, tablets, and wearables which may be used to execute the system 110 or may have the structure of the hardware platform 1000. The hardware platform 1000 may include additional components not shown and that some of the components described may be removed and/or modified. In another example, a computer system with multiple GPUs can sit on external-cloud platforms including Amazon Web Services™, or internal corporate cloud computing clusters, or organizational computing resources, etc.

The hardware platform 1000 may be a computer system 1000 that may be used with the examples described herein. The computer system 1000 may represent a computational platform that includes components that may be in a server or another computer system. The computer system 1000 may execute, by a processor (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 1000 may include a processor 1005 that executes software instructions or code stored on a non-transitory computer-readable storage medium 1015 to perform methods of the present disclosure. The software code includes, for example, instructions to gather data and documents and analyze documents. In an example, the data profiler 130, the data evaluator 140, and the data modeler 150 may be software codes or components performing these steps.

The instructions on the computer-readable storage medium 1015 are read and stored the instructions in a storage 1010 or in random access memory (RAM) 1020. The storage 1010 provides a large space for keeping static data where at least some instructions could be stored for later execution. The stored instructions may be further compiled to generate other representations of the instructions and dynamically stored in the RAM 1020. The processor 1005 reads instructions from the RAM 1020 and performs actions as instructed.

The computer system 1000 further includes an output device 1025 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 1000 further includes input device 1030 to provide a user or another device with mechanisms for entering data and/or otherwise interact with the computer system 1000. The input device may include, for example, a keyboard, a keypad, a mouse, or a touchscreen. Each of these output devices 1025 and input devices 1030 could be joined by one or more additional peripherals. In an example, the output device 1025 may be used to display the results of the data modeling requirement 202.

A network communicator 1035 may be provided to connect the computer system 1000 to a network and in turn to other devices connected to the network including other clients, servers, data stores, and interfaces, for instance. A network communicator 1035 may include, for example, a network adapter such as a LAN adapter or a wireless adapter. The computer system 1000 includes a data source interface 1040 to access data source 1045. A data source is an information resource. As an example, a database of exceptions and rules may be a data source. Moreover, knowledge repositories and curated data may be other examples of data sources.

Figure 11A:
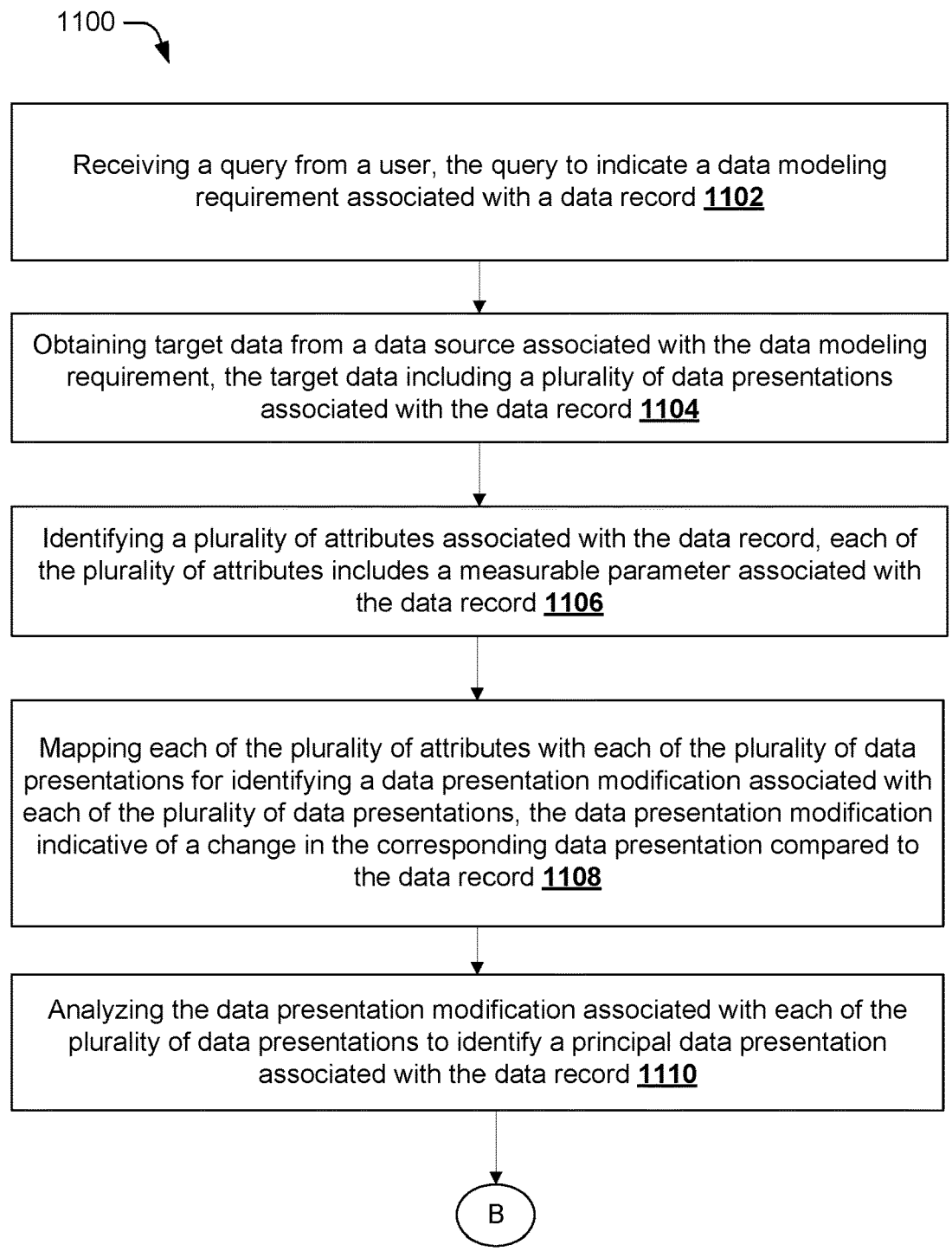
FIGS. 11A and 11B illustrate a process flowchart for data profiling and monitoring, according to an example embodiment of the present disclosure.
Figure 11B:
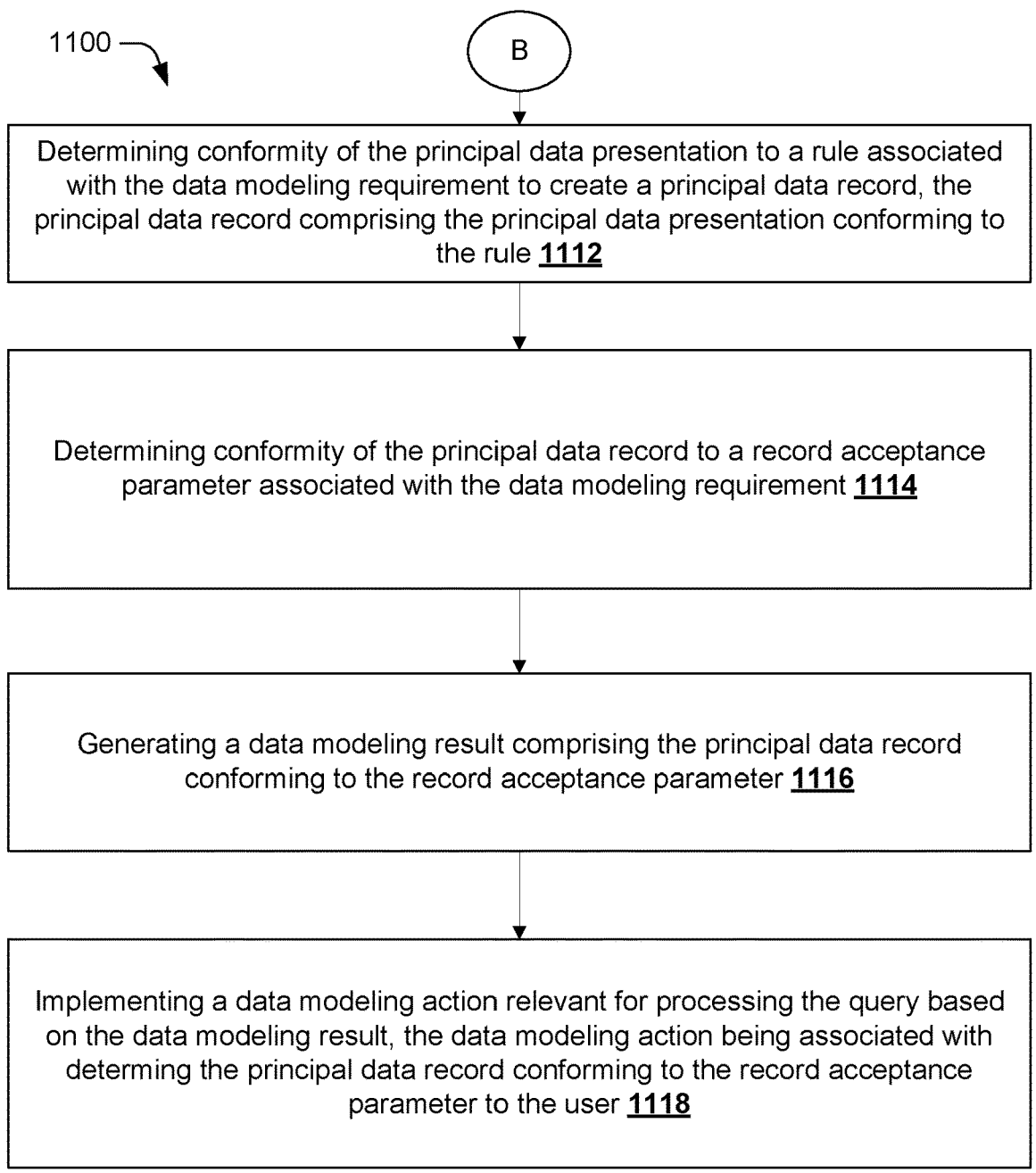

FIGS. 11A and 11B illustrate a process flowchart for data profiling and monitoring using the data profiling and monitoring system 110, according to an example embodiment of the present disclosure. It should be understood that method steps are shown here for reference only and other combinations of the steps may be possible. Further, the method 1100 may contain some steps in addition to the steps shown in FIG. 6. For the sake of brevity, construction, and operational features of the system 110 which are explained in detail in the description of FIGS. 1-10 are not explained in detail in the description of FIGS. 11A and 11B. The method 1100 may be performed by a component of the system 110.

At block 1102, the query may be received from the user. The query may indicate the data modeling requirement 202 associated with the data record 204.

At block 1104, target data 206 may be obtained from the data source 208 associated with the data modeling requirement 202. The target data 206 may include the data presentations 210 associated with the data record 204.

At block 1106, the plurality of attributes 212 associated with the data record 204 may be identified. Each of the plurality of attributes 212 may include the measurable parameter associated with the data record 204. The measurable parameter may be used to compare the data presentations 210 associated with the data record 204.

At block 1108, each of the plurality of attributes 212 may be mapped with each of the plurality of data presentations 210 for identifying the data presentation modification 214 associated with each of the plurality of data presentations 210. The data presentation modification 214 may be indicative of a change in the corresponding data presentation as compared to the data record 204.

At block 1110, the data presentation modification 214 associated with each of the plurality of data presentations 210 may be analyzed to identify the principal data presentation 216 associated with the data record 204.

At block 1112, the conformity of the principal data presentation 216 to a rule may be determined to create the principal data record 222. The rule may be associated with the data modeling requirement 202. The principal data record 222 may comprise the principal data presentation 216 conforming to the rule.

At block 1114, the conformity of the principal data record 222 to a record acceptance parameter 224 may be determined. The record acceptance parameter 224 may be associated with the data modeling requirement 202.

At block 1116, the data modeling result 238 comprising the principal data record 222 conforming to the record acceptance parameter 224 may be generated.

At block 1118, the data modeling action relevant for processing the query may be implemented based on the data modeling result 238. The data modeling action may be associated with determining the principal data record 222 conforming to the record acceptance parameter 224 to the user.

In accordance with various embodiments of the present disclosure, the method 1100 may further comprise analysis of the data presentation modification 214 associated with each of the data presentations 210 to create a data presentation repository. The method 1100 may further include mapping each of the data presentations 210 in the data presentation repository with the data record 204 to identify the principal data presentation 216. The method 1100 may further include designating a unique identifier to each of the data presentations 210 in the data presentation repository based on corresponding data presentation modification 214 associated with each of the data presentations 210.

In accordance with various embodiments of the present disclosure, the method 1100 may include identifying the rule 218 associated with the data modeling requirement 202. The method 1100 may further include receiving the rule data 220 associated with the rule 218 from a pre-existing library. For example, the rule data 220 may be associated with at least one of a governance issue, a data risk, a compliance issue, and a security issue associated the data record 204. Further, the method 1100 may include detecting nonconformity of the principal data presentation 216 with the rule 218 and designating the principal data presentation 216 inappropriate for resolving the data modeling requirement 202 based on the aforementioned nonconformity. The method 1100 may further include detecting nonconformity of the principal data record 222 with the record acceptance parameter 224 and designating the principal data record 222 inappropriate for resolving the data modeling requirement 202 based on the aforementioned nonconformity.

The method 1100 may be practiced over a non-transitory computer-readable medium including machine readable instructions that are executable by a processor.

The present disclosure provides efficient data profiling, monitoring, and enhancement that may account for the various factors mentioned above, amongst others. The present disclosure provides a robust approach to perform dataset version control and subsequent evaluation for the conformation of the dataset to various regulations in an automated manner.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth with respect to illustration only and are not meant as limitations. Many variations are possible within the spirit and scope of the subject matter, which is intended to be defined by the following claims and their equivalents in which all terms are meant in their broadest reasonable sense unless otherwise indicated.

I claim:

1. A system comprising:
a processor;
a data profiler coupled to the processor, the data profiler to:
receive a query from a user, the query indicating a data modeling requirement associated with a data record comprising a binary object file, wherein the data modeling requirement is associated with implementing an automated version control on the binary object file;
obtain target data from a data source associated with the data modeling requirement, the target data including a plurality of data presentations associated with the data record, wherein the data source comprises a plurality of visualization and programming interfaces used to create the data record, wherein the plurality of data presentations include different versions of the data record;
automatically identify a hash generated for each version of the different versions of the data record;
perform an automated version control on the target data by monitoring each version of the data record at predetermined intervals and detecting a change in each of the plurality of versions of the data record in predetermined folder locations including at least one of World Wide Web, a network, and local databases, wherein the change is detected by comparing the hash of a version of the data record with corresponding hashes of other versions of the data record for identifying a data presentation modification in a corresponding version of the data record, the data presentation modification indicative of the change in the corresponding version compared to other versions of the data record;
upon the detection of the change in the corresponding version of the data record, automatically upload the corresponding version of the data record with the detected change at a web location different from the predetermined folder locations; and
analyze the data presentation modification associated with each of the plurality of versions of the data record to identify a principal data presentation associated with the data record, wherein the principal data presentation is the most updated version associated with the data record, wherein the analysis of the data presentation modification is performed to create a data repository, wherein the analysis of the data presentation modification is performed by:
assigning a unique identifier to each of the plurality of versions of the data record based on the corresponding data presentation modification;
storing each of the plurality of versions of the data record in a local database based on the assigned identifier; and
retrieving the principal data presentation using the assigned identifier;
a data evaluator coupled to the processor, the data evaluator to:
retrieve a rule associated with the data modeling requirement from a pre-existing library, wherein the rule is configured to capture cipher keys and data exchange between the data record and other data sources, and wherein the rule is indigested by deploying one or more tools via an Application Programming Interface (API);
determine conformity of the principal data presentation with the rule associated with the data modeling requirement to create a principal data record, the principal data record comprising the principal data presentation conforming to the rule, wherein the determination is performed by mapping of metadata associated with the rule with metadata associated with the principal data presentation; and
a data modeler coupled to the processor, the data modeler to:
identify a record acceptance parameter associated with the data modeling requirement from a pre-existing parameter database;
determine conformity of the principal data record with the record acceptance parameter associated with the data modeling requirement, wherein the determination comprises monitoring interaction between a file tester, a web-based file, and data sets accessed by a web-based instance of the data record;
in response to the determination that the principal data record is conformed with a record acceptance parameter, generate a data modeling result comprising the principal data record conforming to the record acceptance parameter;
implement a data modeling action for processing the query based on the data modeling result, the data modeling action being associated with determining the principal data record conforming to the record acceptance parameter;
upon detection of nonconformity of the principal data record with the record acceptance, perform a secondary automated version control on binary object files stored in the data repository for the principal data record using change detection and monitoring processes for the principal data record; and
upon the performing the secondary automated version control, integrate different versions of the principal data record into an integrated file based on results of the secondary automated version control.

2. The system as claimed in claim 1, wherein the data profiler maps each of the plurality of data presentations in the data repository with the data record to identify the principal data presentation.

3. The system as claimed in claim 1, wherein the data evaluator:
receives rule data associated with the rule from a pre-existing library, the rule data being associated with at least one of a governance issue, a data risk, a compliance issue, and a security issue associated with the data record.

4. The system as claimed in claim 3, wherein the data evaluator:
  detects nonconformity of the principal data presentation to the rule based on comparing the principal data presentation with the rule data; and
  designates the principal data presentation as inappropriate for resolving the data modeling requirement.

5. The system as claimed in claim 1, wherein the data modeler:
  designates the principal data record as inappropriate for resolving the data modeling requirement, wherein the detection of nonconformity of the principal data record with the record acceptance is performed based on comparing the principal data record with the record acceptance parameter data.

6. A method comprising:
  receiving, by a processor, a query from a user, the query indicating a data modeling requirement associated with a data record comprising a binary object file, wherein the data modeling requirement is associated with implementing an automated version control on the binary object file;
  obtaining, by the processor, target data from a data source associated with the data modeling requirement, the target data including a plurality of data presentations associated with the data record, wherein the data source comprises a plurality of visualization and programming interfaces used to create the data record, wherein the plurality of data presentations include different versions of the data record;
  automatically identifying, by the processor, a hash generated for each version of the different versions of the data record;
  performing, by the processor, an automated version control on the target data by monitoring each version of the data record at predetermined intervals and detecting a change in each of the plurality of versions of the data record in predetermined folder locations including at least one of World Wide Web, a network, and local databases, wherein the change is detected by comparing the hash of a version of the data record with corresponding hashes of other versions of the data record for identifying a data presentation modification in a corresponding version of the data record, the data presentation modification indicative of the change in the corresponding version compared to other versions of the data record;
  upon the detection of the change in the corresponding version of the data record, automatically uploading, by the processor, the corresponding version of the data record with the detected change at a web location different from the predetermined folder locations;
  analyzing, by the processor, the data presentation modification associated with each of the plurality of versions of the data record to identify a principal data presentation associated with the data record, wherein the principal data presentation is the most updated version associated with the data record, wherein the analysis of the data presentation modification is performed to create a data repository, wherein the analysis of the data presentation modification is performed by:
    assigning a unique identifier to each of the plurality of versions of the data record based on the corresponding data presentation modification;
    storing each of the plurality of versions of the data record in a local database based on the assigned identifier; and
    retrieving the principal data presentation using the assigned identifier;
  retrieving, by the processor, a rule associated with the data modeling requirement from a pre-existing library, wherein the rule is configured to capture cipher keys and data exchange between the data record and other data sources, and wherein the rule is indigested by deploying one or more tools via an Application Programming Interface (API);
  determining, by the processor, conformity of the principal data presentation with the rule associated with the data modeling requirement to create a principal data record, the principal data record comprising the principal data presentation conforming to the rule, wherein the determination is performed by mapping of metadata associated with the rule with metadata associated with the principal data presentation;
  identifying, by the processor, a record acceptance parameter associated with the data modeling requirement from a pre-existing parameter database;
  determining, by the processor, conformity of the principal data record with the record acceptance parameter associated with the data modeling requirement, wherein the determination comprises monitoring interaction between a file tester, a web-based file, and data sets accessed by a web-based instance of the data record;
  in response to the determination that the principal data record is conformed with a record acceptance parameter, generating, by the processor, a data modeling result comprising the principal data record conforming to the record acceptance parameter;
  implementing, by the processor, a data modeling action for processing the query based on the data modeling result, the data modeling action being associated with determining the principal data record conforming to the record acceptance parameter;
  upon detection of nonconformity of the principal data record with the record acceptance, performing, by the processor, a secondary automated version control on binary object files stored in the data repository for the principal data record using change detection and monitoring processes for the principal data record; and
  upon the performing the secondary automated version control, integrating, by the processor, different versions of the principal data record into an integrated file based on results of the secondary automated version control.

7. The method as claimed in claim 6, wherein the method further comprises mapping, by the processor, each of the plurality of data presentations in the data repository with the data record to identify the principal data presentation.

8. The method as claimed in claim 6, wherein the method further comprises
  receiving, by the processor, rule data associated with the rule from a pre-existing library, the rule data being associated with at least one of a governance issue, a data risk, a compliance issue, and a security issue associated with the data record.

9. The method as claimed in claim 8, wherein the method further comprises:
  detecting, by the processor, nonconformity of the principal data presentation to the rule based on comparing the principal data presentation with the rule data; and
  designating, by the processor, the principal data presentation as inappropriate for resolving the data modeling requirement.

10. The method as claimed in claim 6, wherein the method further comprises:
designating, by the processor, the principal data record as inappropriate for resolving the data modeling requirement, wherein the detection of nonconformity of the principal data record with the record acceptance is performed based on comparing the principal data record with the record acceptance parameter data.

11. A non-transitory computer-readable medium including machine readable instructions that are executable by a processor to:
receive a query from a user, the query indicating a data modeling requirement associated with a data record comprising a binary object file, wherein the data modeling requirement is associated with implementing an automated version control on the binary object file;
obtain target data from a data source associated with the data modeling requirement, the target data including a plurality of data presentations associated with the data record, wherein the data source comprises a plurality of visualization and programming interfaces used to create the data record, wherein the plurality of data presentations include different versions of the data record;
automatically identify hash generated for each version of the different versions of the data record;
perform an automated version control on the target data by monitoring each version of the data record at predetermined intervals and detecting a change in each of the plurality of versions of the data record in predetermined folder locations including at least one of World Wide Web, a network, and local databases, wherein the change is detected by comparing the hash of a version of the data record with corresponding hashes of other versions of the data record for identifying a data presentation modification in a corresponding version of the data record, the data presentation modification indicative of the change in the corresponding version compared to other versions of the data record;
upon the detection of the change in the corresponding version of the data record, automatically upload the corresponding version of the data record with the detected change at a web location different from the predetermined folder locations;
analyze the data presentation modification associated with each of the plurality of versions of the data record to identify a principal data presentation associated with the data record, wherein the principal data presentation is the most updated version associated with the data record, wherein the analysis of the data presentation modification is performed to create a data repository, wherein the analysis of the data presentation modification is performed by:
assigning a unique identifier to each of the plurality of versions of the data record based on the corresponding data presentation modification;
storing each of the plurality of versions of the data record in a local database based on the assigned identifier; and
retrieving the principal data presentation using the assigned identifier;
retrieve a rule associated with the data modeling requirement from a pre-existing library, wherein the rule is configured to capture cipher keys and data exchange between the data record and other data sources, and wherein the rule is indigested by deploying one or more tools via an Application Programming Interface (API);
determine conformity of the principal data presentation with the rule associated with the data modeling requirement to create a principal data record, the principal data record comprising the principal data presentation conforming to the rule, wherein the determination is performed by mapping of metadata associated with the rule with metadata associated with the principal data presentation;
identify a record acceptance parameter associated with the data modeling requirement from a pre-existing parameter database;
determine conformity of the principal data record with the record acceptance parameter associated with the data modeling requirement, wherein the determination comprises monitoring interaction between a file tester, a web-based file, and data sets accessed by a web-based instance of the data record;
in response to the determination that the principal data record is conformed with a record acceptance parameter, generate a data modeling result comprising the principal data record conforming to the record acceptance parameter;
implement a data modeling action for processing the query based on the data modeling result, the data modeling action being associated with determining the principal data record conforming to the record acceptance parameter;
upon detection of nonconformity of the principal data record with the record acceptance, perform a secondary automated version control on binary object files stored in the data repository for the principal data record using change detection and monitoring processes for the principal data record; and
upon the performing the secondary automated version control, integrate different versions of the principal data record into an integrated file based on results of the secondary automated version control.

12. The non-transitory computer-readable medium of claim 11, wherein the processor is to map each of the plurality of data presentations in the data repository with data record to identify the principal data presentation.

13. The non-transitory computer-readable medium of claim 11, wherein the processor is to:
receive rule data associated with the rule from a pre-existing library, the rule data being associated with at least one of a governance issue, a data risk, a compliance issue, and a security issue associated with the data record;
detect nonconformity of the principal data presentation to the rule based on comparing the principal data presentation with the rule data; and
designate the principal data presentation as inappropriate for resolving the data modeling requirement.

14. The non-transitory computer-readable medium of claim 11, wherein the processor is to:
designate the principal data record as inappropriate for resolving the data modeling requirement, wherein the detection of nonconformity of the principal data record with the record acceptance is performed based on comparing the principal data record with the record acceptance parameter data.

* * * * *